(12) United States Patent
Hadi et al.

(10) Patent No.: US 7,991,671 B2
(45) Date of Patent: Aug. 2, 2011

(54) SCANNING BASED SPREADS USING A HEDGE RATIO NON-LINEAR OPTIMIZATION MODEL

(75) Inventors: Muhammed Hadi, Chicago, IL (US); Amy Stephen, Chicago, IL (US); Ketan Patel, Hanover Park, IL (US); Dmitriy Glinberg, Northbrook, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 522 days.

(21) Appl. No.: 12/056,465

(22) Filed: Mar. 27, 2008

(65) Prior Publication Data

US 2009/0248588 A1 Oct. 1, 2009

(51) Int. Cl.
*G06Q 40/00* (2006.01)
(52) U.S. Cl. ........................................................ 705/36
(58) Field of Classification Search ................ 705/35–38
See application file for complete search history.

(56) References Cited

U.S. PATENT DOCUMENTS

| | | | |
|---|---|---|---|
| 5,557,517 A | 9/1996 | Daughterty, III | |
| 5,884,286 A | 3/1999 | Daughtery, III | |
| 5,963,923 A | 10/1999 | Garber | |
| 6,064,985 A | 5/2000 | Anderson | |
| 6,263,321 B1 | 7/2001 | Daughtery, III | |
| 6,321,212 B1 | 11/2001 | Lange | |
| 6,360,210 B1 | 3/2002 | Wallman | |
| 6,832,210 B1 | 12/2004 | Li | |
| 6,938,009 B1 | 8/2005 | Herbst et al. | |
| 7,236,953 B1 * | 6/2007 | Cooper et al. | ............... 705/36 R |
| 2001/0011243 A1 | 8/2001 | Dembo et al. | |
| 2001/0039524 A1 | 11/2001 | Harrison, Jr. et al. | |
| 2001/0056392 A1 | 12/2001 | Daughtery, III | |
| 2002/0010670 A1 * | 1/2002 | Mosler et al. | .................... 705/37 |
| 2002/0035531 A1 | 3/2002 | Push | |
| 2002/0042770 A1 | 4/2002 | Slyke et al. | |
| 2002/0073018 A1 | 6/2002 | Mulinder et al. | |
| 2002/0077947 A1 | 6/2002 | Ward et al. | |
| 2002/0107784 A1 | 8/2002 | Hancock et al. | |
| 2002/0111874 A1 | 8/2002 | Al-Kazily | |
| 2002/0147671 A1 | 10/2002 | Sloan et al. | |
| 2002/0194105 A1 | 12/2002 | Klein | |
| 2002/0194113 A1 | 12/2002 | Lof et al. | |
| 2003/0009408 A1 | 1/2003 | Korin | |
| 2003/0014342 A1 | 1/2003 | Vande Pol | |
| 2003/0033240 A1 | 2/2003 | Balson et al. | |
| 2003/0055765 A1 | 3/2003 | Bernhardt | |
| 2003/0101123 A1 | 5/2003 | Alvarado et al. | |
| 2003/0101125 A1 | 5/2003 | McGill et al. | |
| 2003/0130917 A1 | 7/2003 | Crovetto | |
| 2003/0135448 A1 | 7/2003 | Aguias et al. | |

(Continued)

OTHER PUBLICATIONS

Sungard, "GMS Global Margin Server", information sheet, SunGard Futures Systems, Chicago, IL, 2 pages, undated.

(Continued)

*Primary Examiner* — Thu-Thao Havan
*Assistant Examiner* — Chia Yi Liu
(74) *Attorney, Agent, or Firm* — Lempia Summerfield Katz LLC

(57) ABSTRACT

The disclosed embodiments utilize hedge ratios to determine the optimal hedge ratio and associated scanning spread. This tells traders what ratios of the quantities of products they should have in their portfolio in order to maintain the status of the portfolios as delta neutral, i.e. be delta hedged, and receive optimal margin credits therefore.

10 Claims, 8 Drawing Sheets

U.S. PATENT DOCUMENTS

| | | | |
|---|---|---|---|
| 2003/0172017 | A1 | 9/2003 | Feingold et al. |
| 2003/0208407 | A1 | 11/2003 | Dawson |
| 2003/0208430 | A1 | 11/2003 | Gershon |
| 2004/0019555 | A1 | 1/2004 | Lara |
| 2004/0054613 | A1 | 3/2004 | Dokken |
| 2004/0139031 | A1 | 7/2004 | Amaitis et al. |
| 2004/0172352 | A1 | 9/2004 | Deretz |
| 2005/0131796 | A1* | 6/2005 | Bridges et al. ............ 705/36 |
| 2005/0137956 | A1 | 6/2005 | Flory et al. |
| 2006/0009997 | A1 | 1/2006 | Felix |
| 2006/0059068 | A1 | 3/2006 | Glinberg et al. |
| 2006/0277134 | A1* | 12/2006 | Glinberg et al. ........... 705/35 |

OTHER PUBLICATIONS

CME memo to: All Firm Personnel, from Clearing House Department dated Nov. 5, 2004, re: "NYBOT and Margining Options on Futures Calendar Spreads in SPAM®" obtained Dec. 13, 2004 from http://www.cme.com/clearing/rmspan/spanadv/printerFriendly/10536.html., 1 page.

CyberTrader, "Margin Requirements", obtained Dec. 13, 2004 from http://www.cybertrader.com/MarginAndFees/Martin/MarginRequirements. aspx, 3 pages.

Ian Brant, Futures Trading Software—"The Margin Account Calculator" article, The Margin Account Calculator © Copyright All Rights Reserved, obtained Dec. 13, 2004 from http://www.marginaccountcalc.com/ , 6 pages.

CME Audit Advisory Notice, re "Revision to Risk Based Capital Requirement", dated Dec. 15, 2000., obtained Dec. 13, 2004 from http://www.cme.com/clearing/clr/advntc/audit_RBC00-01.html, 2 pages.

John F. Summa, OptionsNerd.com "Smart Options Trading Strategies" article obtained Dec. 13, 2004 from http://www.optionsherd.com/oex.htm, © 2003 OptionsNerd.com, 3 pages.

Risk Management System article, Business Line, Feb. 8, 2004, pp. 1-2.

Peter Fortune, New England Economic Review, "Margin Requirements Across Equity-Related Instruments: How Level is the Playing Field?", article, Annual, 2003, pp. 2-31.

Joanne M. Hill, Naviwala, Humza, Journal of Portfolio Management, 61, "Synthetic and Enhanced Index Strategies Using Futures on U.S. Indexes (Special Theme: Derivatives & Risk Management)", article, May, 1999, pp. 31-44.

Paul Kupiec, OECD Economic Studies, "Stock market volatility in OECD countries: Recent trends, consequences for the real economy and proposals for reform", article, Autumn, 1991, pp. 44-87.

CME Span® "The Standard Portfolio Analysis of Risk" brochure, Copyright © 2004 Chicago Mercantile Exchange Inc., 11 pages.

CME "Powerful technology for Risk Analysis and Management" software pamphlet, Copyright © 2001 Chicago Mercantile Exchange, 6 pages.

CME Span® "Components of SPAN" clearing services data, obtained at http://www.cme.com/clr/rmspan/compont2480.html, Sep. 8, 2004, pp. 1-9.

CME Span® "CME Standard Portfolio Analysis of Risk (SPAN)" clearing services data, obtained at http://www.cme.com/clr/rmspan/rrnspan/intro1155.html, Sep. 8, 2004, pp. 1-9.

The Options Clearing Corporation "Margin Methodology" website agreements, obtained at http://www.optionsclearing.com/products/margin.isp, Sep. 8, 2004, pp. 1-3.

CME "Financial Safeguard System of Chicago Mercantile Exchange", brochure, Copyright © 2004 Chicago Mercantile Exchange Inc., 16 pages.

Mattias Bylund, "A Comparison of Margin Calculation Methods for Exchange Traded Contracts", Feb. 2002, thesis, 86 pages.

Review of Standard Portfolio Analysis of Risk ("SPAN") Margin System as Implemented by the Chicago Mercantile Exchange Board of Trade Clearing Corporation and the Chicago Board of Trade, Commodity Futures Trading Commission Division of Trading Markets, Apr. 200, 18 pages, htt;://www.cftc.gov/files/tm/tmspan_margin043001.pdf.

Fortune; "Margin Requirements Across Equity-related Instruments: How Level is The Playing field?"; New England Economic Review 31(20); pp. 31-50; Dec. 2003.

PCT International Search Report PCT/US05/31137.
PCT International Search Report PCT/US05/31036.
PCT International Search Report PCT/US05/31136.
PCT International Search Report PCT/US05/31181.
PCT International Search Report PCT/US05/31037.
PCT International Search Report PCT/US05/31050.

CME, Components of SPAN: SPAN: Clearing Services, obtained at http://web.archive.org/web/20030819161552/http:/www.cme.com/clr/rmspan/compont2480.html., printed Jan. 9, 2008 from internet archive Aug. 13, 2003, 9 pgs.

International Search Report, PCT/US09/35980.

International Preliminary Report on Patentability and Written Opinion of the International Searching Authority, PCT/US09/35980.

* cited by examiner

SPAN® MINIMUM PERFORMANCE BOND REQUIREMENTS
Interest Rate Products, Intra-Commodity Spreads

FIG. 4A

Eurodollar (ED) - Tier 4 vs. Tier 4 [Months 13-16 vs. Months 13-16]

| Rate Type | Change | Current Initial | Current Maintenance | New Initial | New Maintenance |
|---|---|---|---|---|---|
| Intra-Commodity Spread – Spec | Decrease | $237 | $175 | $135 | $100 |
| Intra-Commodity Spread – Hedge | Decrease | $175 | $175 | $100 | $100 |
| Intra-Commodity Spread – Member | Decrease | $175 | $175 | $100 | $100 |

Eurodollar (ED) - Tier 4 vs. Tier 5 [Months 13-16 vs. Months 17-20]

| Rate Type | Change | Current Initial | Current Maintenance | New Initial | New Maintenance |
|---|---|---|---|---|---|
| Intra-Commodity Spread – Spec | Decrease | $304 | $225 | $203 | $150 |
| Intra-Commodity Spread – Hedge | Decrease | $225 | $225 | $150 | $150 |
| Intra-Commodity Spread – Member | Decrease | $225 | $225 | $150 | $150 |

Eurodollar (ED) - Tier 4 vs. Tier 6 [Months 13-16 vs. Months 21-24]

| Rate Type | Change | Current Initial | Current Maintenance | New Initial | New Maintenance |
|---|---|---|---|---|---|
| Intra-Commodity Spread – Spec | Decrease | $372 | $275 | $270 | $200 |
| Intra-Commodity Spread – Hedge | Decrease | $275 | $275 | $200 | $200 |
| Intra-Commodity Spread – Member | Decrease | $275 | $275 | $200 | $200 |

Eurodollar (ED) - Tier 4 vs. Tier 7 [Months 13-16 vs. Months 25-28]

| Rate Type | Change | Current Initial | Current Maintenance | New Initial | New Maintenance |
|---|---|---|---|---|---|
| Intra-Commodity Spread – Spec | Decrease | $405 | $300 | $304 | $225 |
| Intra-Commodity Spread – Hedge | Decrease | $300 | $300 | $225 | $225 |
| Intra-Commodity Spread – Member | Decrease | $300 | $300 | $225 | $225 |

Eurodollar (ED) - Tier 4 vs. Tier 8 [Months 13-16 vs. Months 29-32]   FIG. 4B

| Rate Type | Change | Current Initial | Current Maintenance | New Initial | New Maintenance |
|---|---|---|---|---|---|
| Intra-Commodity Spread – Spec | Decrease | $473 | $350 | $405 | $300 |
| Intra-Commodity Spread – Hedge | Decrease | $350 | $350 | $300 | $300 |
| Intra-Commodity Spread – Member | Decrease | $350 | $350 | $300 | $300 |

Eurodollar (ED) - Tier 4 vs. Tier 9 [Months 13-16 vs. Months 33-36]

| Rate Type | Change | Current Initial | Current Maintenance | New Initial | New Maintenance |
|---|---|---|---|---|---|
| Intra-Commodity Spread – Spec | Decrease | $540 | $400 | $473 | $350 |
| Intra-Commodity Spread – Hedge | Decrease | $400 | $400 | $350 | $350 |
| Intra-Commodity Spread – Member | Decrease | $400 | $400 | $350 | $350 |

Eurodollar (ED) - Tier 4 vs. Tier 10 [Months 13-16 vs. Months 37-40]

| Rate Type | Change | Current Initial | Current Maintenance | New Initial | New Maintenance |
|---|---|---|---|---|---|
| Intra-Commodity Spread – Spec | Decrease | $642 | $475 | $574 | $425 |
| Intra-Commodity Spread – Hedge | Decrease | $475 | $475 | $425 | $425 |
| Intra-Commodity Spread – Member | Decrease | $475 | $475 | $425 | $425 |

Eurodollar (ED) - Tier 4 vs. Tier 11 [Months 13-16 vs. Months 41-44]

| Rate Type | Change | Current Initial | Current Maintenance | New Initial | New Maintenance |
|---|---|---|---|---|---|
| Intra-Commodity Spread – Spec | Decrease | $743 | $550 | $675 | $500 |
| Intra-Commodity Spread – Hedge | Decrease | $550 | $550 | $500 | $500 |
| Intra-Commodity Spread - Member | Decrease | $550 | $550 | $500 | $500 |

|  | TUZ7 | FVZ7 | TYZ7 | USZ7 |
|---|---|---|---|---|
| 26 TUZ7 | 1 | 0.925926 | 0.609756 | 0.355113636 |
| 25 FVZ7 | 1.08 | 1 | 0.658762 | 0.383582662 |
| 21 TYZ7 | 1.64 | 1.518 | 1 | 0.582411182 |
| 17 USZ7 | 2.816 | 2.607 | 1.717 | 1 |

| # contracts | | 26 TUZ7 | 25 FVZ7 | 21 TYZ7 | 17 USZ7 |
|---|---|---|---|---|---|
| 26 | 8.4448 TUZ7 | 8.445 | 7.819 | 5.149 | 2.999 |
| 25 | 7.8192 FVZ7 | 8.445 | 7.819 | 5.151 | 2.999 |
| 21 | 5.1510 TYZ7 | 8.448 | 7.819 | 5.151 | 3.000 |
| 17 | 3.0000 USZ7 | 8.448 | 7.821 | 5.151 | 3.000 |

| First Leg | Second Leg | First Outright Margin First Leg | Second Outright Margin Second Leg | Ratio First Leg | Ratio Second Leg | Credit Rate | Implied Margin | Outright Margin | Implied Credit | Squared Diff |
|---|---|---|---|---|---|---|---|---|---|---|
| 25 | 26 | 650 | 650 | 7 | 8 | 0.9 | 1105 | 9750 | 88.67% | 0.0001778 |
| 21 | 25 | 850 | 650 | 5 | 7 | 0.9 | 725 | 8800 | 91.76% | 0.0003102 |
| 21 | 26 | 850 | 650 | 5 | 8 | 0.8 | 1800 | 9450 | 80.95% | 9.07E-05 |
| 17 | 21 | 1200 | 850 | 3 | 5 | 0.9 | 1010 | 7850 | 87.13% | 0.0008215 |
| 17 | 25 | 1200 | 650 | 3 | 7 | 0.8 | 1670 | 8150 | 79.51% | 2.409E-05 |
| 17 | 26 | 1200 | 650 | 3 | 8 | 0.7 | 2680 | 8800 | 69.55% | 2.066E-05 |

| Optimal Ratio of last contract | | |
|---|---|---|
| 3 | 1.445005 | |
| 1 | 62.60189 | |
| 2 | 8.947063 | |
| 3 | 1.445005 | |
| 4 | 8.761843 | |
| 5 | 7.371844 | |
| 6 | 2.787602 | |
| 7 | 5.199235 | |
| 8 | 2.816209 | |
| 9 | 4.133353 | |
| 10 | 5.6289 | |

# SCANNING BASED SPREADS USING A HEDGE RATIO NON-LINEAR OPTIMIZATION MODEL

CROSS-REFERENCE TO RELATED APPLICATIONS

This application relates to and describes further aspects of the embodiments disclosed in the following patent applications, which are incorporated herein in their entirety by reference for all purposes:
  U.S. patent application Ser. No. 11/030,815, titled "SYSTEM AND METHOD FOR ACTIVITY BASED MARGINING", filed Jan. 7, 2005;
  U.S. patent application Ser. No. 11/030,796, titled "SYSTEM AND METHOD FOR EFFICIENTLY USING COLLATERAL FOR RISK OFFSET", filed Jan. 7, 2005;
  U.S. patent application Ser. No. 11/030,833, titled "SYSTEM AND METHOD FOR ASYMMETRIC OFFSETS IN A RISK MANAGEMENT SYSTEM", filed Jan. 7, 2005;
  U.S. patent application Ser. No. 11/030,814, titled "SYSTEM AND METHOD FOR DISPLAYING A COMBINED TRADING AND RISK MANAGEMENT GUI DISPLAY", filed Jan. 7, 2005;
  U.S. patent application Ser. No. 11/031,182, titled "SYSTEM AND METHOD FOR FLEXIBLE SPREAD PARTICIPATION", filed Jan. 7, 2005;
  U.S. patent application Ser. No. 11/030,869, titled "SYSTEM AND METHOD FOR HYBRID SPREADING FOR RISK MANAGEMENT", filed Jan. 7, 2005;
  U.S. patent application Ser. No. 11/030,849, titled "SYSTEM AND METHOD OF MARGINING FIXED PAYOFF PRODUCTS", filed Jan. 7, 2005;
  U.S. patent application Ser. No. 11/845,198, titled "ASYMMETRIC AND VOLATILITY MARGINING FOR RISK OFFSET", 4672/648), filed Aug. 27, 2007;
  U.S. patent application Ser. No. 11/204,379, titled "SYSTEM AND METHOD FOR USING DIVERSIFICATION SPREADING FOR RISK OFFSET", filed Aug. 15, 2006; and
  U.S. patent application Ser. No. 11/965,221, titled "MARGIN OFFSETS ACROSS PORTFOLIOS", filed Dec. 27, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Futures Exchanges, referred to herein also as an "Exchange", such as the Chicago Mercantile Exchange Inc. (CME), provide a marketplace where future contracts and options on futures are traded. In an example, a futures contract is a standardized, legally binding agreement to buy or sell a commodity, security, financial product or other underlying instrument or investment vehicle at a specified price at a predetermined future time. The futures contract specifies commodity, quality, quantity, delivery date and settlement.

An option is the right, but not the obligation, to sell or buy an underlying instrument (in this case, a futures contract) at a specified price within a specified time. A put option on a future grants the right, but not the obligation, to sell a futures contract at the stated price prior to the expiration date and a call option gives the buyer the right, but not the obligation, to purchase a specific futures contract at a fixed price (strike price) within a specified period of time. The buyer has the right to buy the commodity (underlying futures contract) or enter a long position (e.g., a position in which the trader has bought a futures contract that does not offset a previously established short position). A call writer (seller) has the obligation to sell the commodity (or enter a short position (e.g., the opposite of a long position) at a fixed price (strike price) during a certain fixed time. The term "short" refers to one who has sold a futures contract to establish a market position, and who has not yet closed out this position through an offsetting procedure. An offset may refer to taking a second futures or options on futures position opposite to the initial or opening position (e.g., selling if one has bought, or buying if one has sold).

The Exchange may act as a "clearing house" whereby trades are confirmed, matched and settled each day until offset or delivered. The clearing house may settle trading accounts, clear trades, collect and maintain performance bond funds, regulate delivery and report trading data. The Clearing House acts as a central counterparty by which the clearing house is the buyer to each seller, and seller to each buyer, thereby protecting buyers and sellers from financial loss by assuring performance. An example of a clearing house is the Clearing House of the Chicago Mercantile Exchange ("CME"). Although the disclosed embodiments are described in reference to the CME, it all present and future embodiments are applicable to any Exchange and/or clearing house, including those which trade in equities and other securities.

The Clearing House establishes clearing level performance bonds for and establishes minimum performance bond requirements. A performance bond, also referred to as a margin, is the amount of funds that must be deposited by a trader with his or her broker, by a broker with a clearing member or by a clearing member with the Clearing House, to insure the broker or Clearing House against loss on open futures or options contracts. This performance bond is not a partial payment; rather, it acts to ensure the financial integrity of brokers, clearing members and the Exchange. The Performance Bond to Clearing House refers to the minimum dollar deposit which is required by the Clearing House from clearing members in accordance with their positions. Maintenance, or maintenance margin, refers to a sum, usually smaller than the initial performance bond, which must remain in the customer's account for any position at all times. The initial margin is the total amount of margin per contract required when a futures position is opened. A drop in funds below this level requires a deposit back to the initial margin levels. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

CME derives its financial stability in large part by removing debt obligations among market participants. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. Debt obligations from option contracts are also immediately removed, since the purchaser of an option must pay the premium (cost of the option) in full at the time of purchase. Sellers of options post performance bonds, discussed above, as determined by the CME according to the prevailing risk characteristics of the options sold. CME's mark-to-the-market system does not allow losses to accumulate over time or allow a market participant the opportunity to defer losses associated with market positions.

If a clearing member does not have sufficient performance bond collateral on deposit with the Clearing House, then the clearing member must meet a call for cash performance bond deposits. Clearing members' performance bond deposits may only be:

Cash (such as U.S. dollars, Canadian and Australian dollars, Japanese yen, Euro currency, Swiss francs, British pounds, Norwegian krone, and Swedish krona);

U.S. Treasury securities;

Letters of credit issued in the Exchange's name by approved banks;

Stocks selected from among approximately half of those in the S&P's 500® Stock Price Index and depository trust shares based on the S&P's 500 Stock Price Index;

Selected sovereign debt of Canada, France, Germany, and the UK;

Discount notes issued by the Federal Farm Credit Banks, Federal Home Loan Mortgage Corporation, Federal Home Loan Bank System, or Fannie Mae, provided that the notes have less than six months remaining to maturity;

Fixed rate note and bond securities issued by the Federal Farm Credit Bank, Federal Home Loan Bank, Federal Home Loan Mortgage Corporation, Fannie Mae or Ginnie Mae;

Interest Earning Facility (IEF), a CME managed fund program;

IEF2: Money Market Mutual Funds allowable under CFTC Regulation 1.25; and

IEF3 and IEF4: Clearing firm self-directed collateral management program.

The Clearing House Division monitors intra-day price movements throughout the trading session. To assess the impact of these price changes, an intra-day mark-to-the-market calculation may be performed and reviewed by the Clearing House and Risk Management Departments several times each day, more frequently if price volatility is high. Stress testing of clearing member positions may also be performed on a daily basis. Numerous stress scenarios have been modeled to reflect a diverse universe of possible market events. Stress results are evaluated against performance bond on deposit and also with clearing member adjusted net capital. Results of stress tests may lead to requests that the clearing member provide additional information about its customer accounts such as whether there are non-CME offsetting positions in other markets. In some cases stress test results may cause increases to a clearing member's performance bond requirement, or reduce or transfer positions.

In order to minimize risk to the Exchange while minimizing the burden on members, it is desirable to approximate the requisite performance bond or margin requirement as closely as possible to the actual positions at any given time. Accuracy and flexibility of the mechanisms which estimate performance bond requirements is therefore preferred.

BRIEF DESCRIPTION OF THE DRAWINGS

FIGS. 4A to 4B depict exemplary performance bond requirements.

FIGS. 5-8 depict an operation of the system of FIG. 1 on an exemplary portfolio.

DETAILED DESCRIPTION

Figure 1:
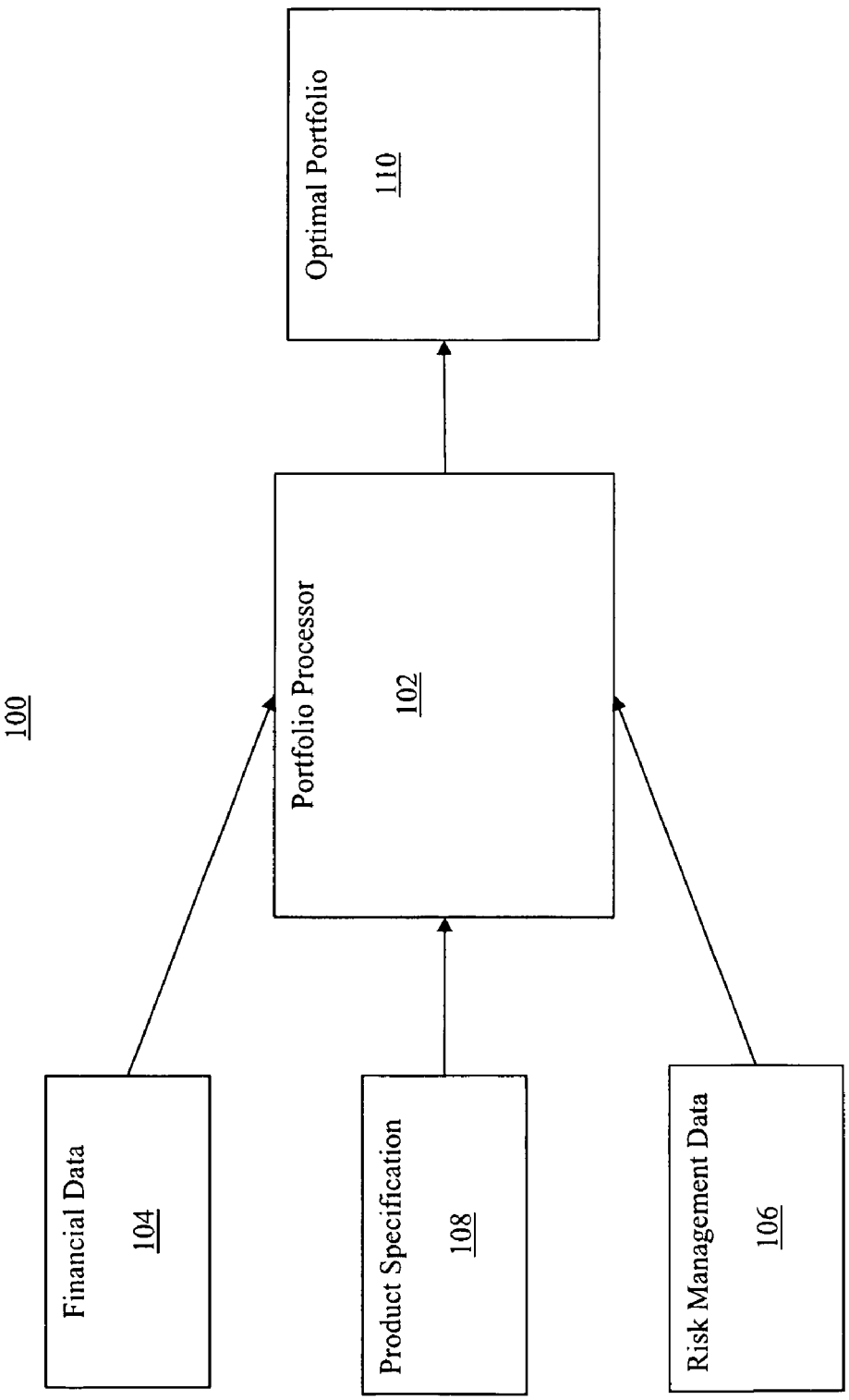
FIG. 1 depicts an exemplary portfolio optimization system according to one embodiment.

By way of introduction, the disclosed embodiments relate to a system and/or method for optimizing margin credits for portfolios while maintaining the delta neutral status of the portfolio. In particular, the disclosed embodiments utilize hedge ratios to determine optimal quantities of a given product to hold to maintain the delta neutral status of the portfolio while maximizing credit towards to margin requirement therefore. As will be described in more detail below, the disclosed embodiments tests quantity variations, which are based on the delta neutral hedge ratios, in the various positions held against the margin credits offered for those positions to determine the variation of quantities which results in margin credits which most closely approximate the maximum possible margin credit.

CME establishes minimum initial and maintenance performance bond levels for all products traded through its facilities. CME bases these requirements on historical price volatilities, current and anticipated market conditions, and other relevant information. Performance bond levels vary by product and are adjusted to reflect changes in price volatility and other factors. Both initial and maintenance performance bonds are good faith deposits to guarantee performance on futures and options contracts. Maintenance performance bond levels represent the minimum amount of protection against potential losses at which the Exchange will allow a clearing member to carry a position or portfolio. Should performance bonds on deposit at the customer level fall below the maintenance level, Exchange rules require that the account be re-margined at the required higher initial performance bond level. Clearing members may impose more stringent performance bond requirements than the minimums set by the Exchanges. At the Clearing House level, clearing members must post at least the maintenance performance bonds for all positions carried. This requirement applies to positions of individual members, nonmember customers and the clearing member itself.

To set performance bond levels, the Clearing House monitors current and historical price movements covering short-, intermediate- and longer-term data using statistical and parametric and non-parametric analysis. Futures maintenance performance bond levels are set to cover at least the maximum one-day price move on 95% of the days during these time periods. The actual performance bond requirements often exceed this level.

Performance bond requirements for options reflect movements in the underlying futures price, volatility, time to expiration and other risk factors, and adjust automatically each day to reflect the unique and changing risk characteristics of each option series. Long options must be paid for in full, and stringent minimum performance bonds are mandated for short option positions. Exemplary performance bond requirements are shown in FIGS. 4A-4B.

The performance bonds may be calculated using a system developed and implemented by CME referred to as Standard Portfolio Analysis of Risk™ (SPAN®). Performance bond requirements are based on the overall risk of the portfolios. SPAN simulates effects of changing market conditions and uses standard options pricing models to determine a portfolio's overall risk.

Futures and options may be treated uniformly while recognizing the unique features of options. In standard options pricing models, three factors most strongly affect options values: the underlying futures price, volatility (variability of futures price) and time to expiration. As these factors change, futures and options may gain or lose value. SPAN constructs scenarios of futures prices and volatility changes to simulate what the portfolio might reasonably lose over a one day time horizon. The resulting SPAN performance bond requirement covers this potential loss.

SPAN evaluates overall portfolio risk by calculating the worst probable loss that a portfolio might reasonably incur over a specified time period. This number is achieved by comparing hypothetical gains and losses that a portfolio would sustain under different market conditions. A "Risk Array" analysis of 16 possible scenarios for a specific portfolio under various conditions is conducted. Users may request any number of scenarios to meet their particular needs:
  Each scenario consists of a "what-if" situation in which SPAN assesses the effects of variations in price, volatility and time to expiration; and
  Each calculation represents a gain or loss based on the possible gains or losses due to changes in an instrument's price by X and volatility by Y.

SPAN licensed clearing organizations and exchanges may determine the following SPAN parameters, in order to reflect the risk coverage desired in a market:
  Price Scan Range: A set range of potential price changes;
  Volatility Scan Range: A set range of potential implied volatility changes;
  Intra commodity Spread Charge: An amount that accounts for risk (basis risk) of calendar spreads or different expirations of the same product, which may not be perfectly correlated;
  Short Option Minimum: Minimum margin requirement for short option positions;
  Spot Charge: A charge that covers the increased risk of positions in deliverable instruments near expiration; and
  Intercommodity Spread Credit: Margin credit for offsetting positions between correlated products.

SPAN combines financial instruments within the same underlying for analysis, and refers to this grouping as the Combined Commodity group. For example, futures options on futures and options on equities on the same stock could all be grouped under a single Combined Commodity.

To calculate a performance bond requirement, for each Combined Commodity in a portfolio, SPAN:
  Sums Scan Risk charges, any Intracommodity Spread and Spot Charges;
  Applies offsets for all Intercommodity Spread Credits within the portfolio;
  Compares the sum with existing Short Option Minimum requirements; and
  Assesses the greater of the two compared as the risk of the Combined Commodity.

The Total Margin Requirement for a portfolio is the sum of the risk of all Combined Commodities less all credit for risk offsets between the different Combined Commodities.

As described, SPAN is utilized by Exchanges and clearing members and other entities as a tool that to determine anticipated performance bond requirements of the clearing house which facilitates financial planning and certainty. It will be appreciated that the disclosed embodiments are equally applicable to both the version of SPAN used by the exchange and the version used by the market participants and that any discussion herein referring to SPAN is intended to be applicable to both applications.

Another system for portfolio risk assessment is referred to as the Theoretical Intermarket Margin System ("TIMS"), by The Options Clearing Corporation, in Chicago, Ill. With TIMS, clearing institutions can measure, monitor and manage a level of risk exposure of their members' portfolios. TIMS can calculate risk exposure at different account levels and for different account types. TIMS uses portfolio theory to margin all positions relating to the same underlying product and combines the risk of closely related products into integrated portfolios. This portfolio aspect of TIMS allows for the recognition of hedges used by market participants in increasingly interrelated markets. TIMS measures the monetary risk inherent in portfolios containing options, futures and options on futures positions. In particular, TIMS uses pricing models to project the liquidation value of each portfolio given changes in the price of each underlying product. These models generate a set of theoretical values based on various factors including current prices, historical prices and market volatility. Based on flexible criteria established by a clearinghouse, statistically significant hedges receive appropriate margin offsets. TIMS also predicts a member's potential intra-day risk under varying sets of assumptions regarding market behavior.

TIMS organizes all classes of options and futures relating to the same underlying asset into class groups and all class groups whose underlying assets exhibit close price correlation into product groups. The daily margin requirement for a clearing member is calculated based on its entire position within a class group and various product groups. The margin requirement consists of two components, a mark-to-market component and an additional margin component.

The mark-to-market component includes a premium margin calculation that provides margin debits or requirements for net short positions and margin credits for net long positions. The margin debits and credits are netted to determine the total premium margin requirement or credit for each class group. The premium margin component represents the cost to liquidate the portfolio at current prices by selling the net long positions and buying back the net short positions.

The additional margin component, the portion of the margin requirement that covers market risk, is calculated using price theory in conjunction with class group margin intervals. TIMS projects the theoretical cost of liquidating a portfolio of positions in the event of an assumed worst case change in the price of the underlying asset. Theoretical values are used to determine what a position will be worth when the underlying asset value changes. Given a set of input parameters (e.g., option contract specifics, interest rates, dividends and volatility), the pricing model will predict what the position should theoretically be worth at a specified price for the underlying instrument.

Another risk management system, referred to as OMS II, the "Window method" or the "Vector method," calculates worst case loss scenarios, store these in vectors, adjust for spreading, and adds the vectors in a way that takes correlation in to account. In OMS II the valuation interval is divided into n (normally n=31) possible up or down moves, additionally for each up or down move the volatility can either increase stand still or decrease. This provides 93 alternative market scenarios (if n=31) to calculate the profit or loss a portfolio will make. OMS II may be viewed mathematically as producing the maximum of the expected loss under each of 93 probability measures. For all 93 scenarios the probability measures are point masses at each of the 93 points in a space $\Omega$ of securities prices and volatilities. Each valuation point is saved in a 31×3 matrix, that is, each row contains a price move and the three volatility fluctuations. The matrix is expanded to a 31×6 matrix so that the case of both a bought and a sold contract is represented in the matrix, this because of additional fine-tunings that are available in OMS II. The matrixes are saved for use when margin requirements of portfolios are calculated.

For accounts containing positions of two or more types of contracts, the overall risk is the combined risk characteristics for the different contracts registered to the account. Cross-margining may take the offsetting characteristics of the instrument into account. Default cross-margining divides the positions into one group per underlying. Positions on instruments within the same underlying are correlated. The default cross-margin may be considered instruments with the same underlying being totally correlated and instruments with different underlying being uncorrelated. During a default cross-margin run a portfolio with instruments on the same underlying will add the valuation files pointwise as in SPAN, and then take the largest negative value as the margin requirement for the portfolio. If the portfolio includes instruments on different underlyings, the largest negative value of each valuation file is added.

However, a default cross-margining method may not consider correlations between different underlyings or different expiry months. Therefore, in OMS II, the "Window method" may be used when a portfolio containing instruments on different underlyings or contracts with different expiry months is margined. In the window method, the different instruments are sorted into a number of groups, called window classes. The window classes have a window size defined in percentage. When the percentage goes down, the correlation goes up and vice versa (e.g., a window size of 0% means that the instruments are totally correlated, and a window size of 100% means that the instruments are uncorrelated). A window class may also be a member of another window class and create a tree structure of more complex correlations.

To calculate the margin for a portfolio, the window is moved from left to the right over the entire valuation interval for all window classes, starting with the bottom of the tree. The window is centered over each valuation point. A margin requirement is calculated at each valuation point where the window is positioned by adding the lowest value for each option position or futures position in the window. The total margin requirement will be the largest negative value of the margin requirements. No negative values indicate a credit, and no margin is required.

A comparison of SPAN, TIMS and OMS II may be found in Bylund, Mattias, "A Comparison of Margin Calculation Methods for Exchange Traded Contracts" (Feb. 21, 2002). Royal Institute of Technology Dept. of Mathematical Statistics, Master Thesis No. 2002-3. http://ssrn.com/abstract=300499, herein incorporated by reference. While the disclosed embodiments will be discussed with reference to the SPAN® risk analysis software, it will be appreciated that they may also be applicable to the TIMS risk analysis software, as well as other products directed at determining performance bond requirements and/or assessing risk in a portfolio of derivatives.

The CME Clearing House requires "gross" performance bonds for customer positions in CME products. A clearing member must deposit performance bonds for each open position (long or short) held at the end of trading day, with appropriate allowances for spreads. A spread is the price difference between two contracts (e.g., holding a long and a short position in two related futures or options on futures contract) with the objective of profiting from a changing price relationship or the assumption of a long and short position on the same business day in the same or related commodities for the same account. A Spread order may be an order that indicates the purchase and sale of futures contracts simultaneously. An example of a spread trade includes the simultaneous purchase and sale of futures contracts for the same commodity or instrument for delivery in different months or in different but related markets. Other types of spread trading involve the simultaneous purchase of one commodity contract against the sale of another related contract. A spread transaction may be established with an expectation that the differential between contacts will widen or narrow. If the trader buys the higher, more valuable leg of the spread, he anticipates that the differential will widen. Conversely, if he sells the higher leg, he believes it will narrow. Natural spreads are available, for example, in the energy market between different months of the same commodity contract, as well as between different products and grades. There are four basic types of spreads:

Intramarket Spreads: a long position in one contract month against a short position in another contract month in the same commodity.

Intermarket Spread Similar or related commodities on different exchanges.

Intercommodity Spreads: A long position in one commodity, and a short position in a different but economically related commodity.

Commodity-Product Spreads: The purchase of a commodity against the sale of an equivalent amount of the product derived from it (or vice versa). In the oil market, this is referred to as a "crack spread."

Calculating Risk Performance Bond/Margin Requirements

The SPAN system is applicable to an unlimited range of product types. Portfolios today, however, can contain the widest range of derivative and non-derivative instruments. SPAN supports and provides for product flexibility using an advanced, object-oriented model. In particular, current implementations adds support for equity and debt securities (stocks, bonds, etc.), and options thereon, foreign exchange, and options thereon.

Account types: Portfolios of positions to be margined are held in performance bond accounts, or margin accounts. The positions in an account constitute a single portfolio. If this is a particular performance bond account of a clearing member firm at a clearing organization, we say that the risk analysis done by that clearing organization for that account is a clearing-level calculation. On the other hand, risk analysis calculations may be performed for particular customer or other accounts of firms which are clearing members, directly or indirectly, of one or more clearing organizations. These are firm-level, also called customer-level, calculations.

For any performance bond account, the account type is defined by:

(a) whether the account is a clearing-level account or a firm-level account, and (b) the specific account type code, for example, member, hedger, or speculator.

Business Functions and Exchange Complexes

A business function represents a particular purpose for which an exchange or clearing organization wishes to perform the risk analysis calculation or have it performed, at either the clearing-level or the customer-level. For example:

Normal clearing-level calculations for the particular clearing organization may be utilized to analyze normal clearing-level account types;

Special member-clearing calculations may be utilized to analyze member clearing account types;

Normal customer-level calculations may be utilized for the part of a portfolio traded on, or cleared by, a particular exchange or clearing organization Clearing-level calculations may be utilized for a particular cross-margin agreement between clearing organizations Customer-level calculations may be utilized for a customer portfolio associated with a particular cross-margin agreement By definition, a clearing-level calculation for a portfolio is always for a specific business function. That is, the portfolio is identified with a specific business function, and may contain only products eligible for that business function. By contrast, a customer-level portfolio may have any number of business functions represented within the portfolio. Business functions are also referred to as exchange complexes, and the identifier for a business function as the exchange complex acronym.

Requirement Levels:

For particular business functions, the exchange or clearing organization may mandate the calculation of more than one requirement number. Each number is called a requirement level, and is specific to: (a) the performance bond class of the requirement level, and (b) the initial or maintenance designation of the requirement level.

Performance bond classes may designate different levels of requirements. The first class (the one with the lowest requirement level) is specially designated as the core class and the second class (the one with the next-highest requirement level) as the reserve class. Any number of performance bond classes can be defined, and for any purpose. The most common purpose is to recognize different requirement levels that may be met by different classes of collateral assets. Typically the core requirement must be met by the highest-quality assets. The difference between the core requirement and the higher reserve requirement, e.g., the reserve additional requirement, may be met by certain lesser-quality assets. Within the specific performance bond class, the exchange or clearing organization may mandate the distinction between the initial requirement level and the maintenance requirement level.

Combined Commodities

For each business function for which an exchange or clearing organization is using SPAN, the set of products eligible for that business function may be grouped into combined commodities. For each business function and for each combined commodity represented within that business function, SPAN yields one or more SPAN risk requirements. Each such requirement corresponds to a specific SPAN requirement level—a specific performance bond class and an initial or maintenance designation. SPAN requirements calculated for individual combined commodities represented in the portfolio are then aggregated to yield SPAN requirements for the different business functions represented within the portfolio, and for the entire portfolio. The combined commodity may be thought of as the atomic-level of the SPAN calculation. It is the lowest breakdown of the products within a portfolio at which a performance bond requirement is obtained. Typically, all products on the same ultimate underlying physical are grouped together into a combined commodity.

Performance Bond Currencies

For each combined commodity, a single currency is specified as the performance bond currency for that combined commodity. This is the currency in which the performance bond requirement for a combined commodity represented within a portfolio, will be denominated. Any number of performance bond currencies may be represented within the portfolio. Therefore, when aggregating requirements for the different combined commodities represented within the portfolio, these are typically first aggregated by performance bond currency. These currency-level requirements may then be converted to a common currency for further aggregation. This common currency may be the native currency for the portfolio.

Span Risk Parameter Files

Clearing organizations and/or exchanges publish, at least once daily, one or more SPAN risk parameter files. SPAN risk parameters may be generically defined as the set of data needed to calculate SPAN requirements, other than the actual portfolios for which the requirements are to be calculated. SPAN risk parameters include (a) product data and (b) performance bond rate data. Typically, SPAN risk parameter files include data for exactly one point in time, and in effect, include data used for performance bond calculations for portfolios existing at that point. Within each point in time, the SPAN file includes data for one or more business functions of the exchange or clearing organization publishing the file. Within each business function, the file will contain data for each combined commodity for the business function. Ultimately, the file will contain many different SPAN rates—for example, risk arrays, intracommodity spread charge rates, intercommodity spread credit rates, etc. Each such rate is qualified by the account type and requirement level to which it pertains.

Point in Time

Risk parameters and portfolios are defined at particular points in time. Points in time are categorized as to whether they are for an end of day settlement, or an intraday point in time. Some clearing organizations, for some business functions, may publish more than one SPAN file for the end-of-day settlement. These are typically distinguished as being for: (a) the final settlement; (b) an early (or preliminary) settlement; or (c) the complete settlement.

In the early settlement SPAN file, typically final end-of-day settlement prices are available only for some of the products, while other products have intraday prices provided. The final settlement file typically contains final settlement prices for the day for all actively trading contracts. The complete file will contain final settlement prices for all contracts, actively trading or inactive.

An intraday point in time is further characterized by its business time—indicating the actual time to which prices and risk arrays pertain. A point in time, whether intraday or end of day, may also be characterized by its run number—for example, the first intraday run, the second intraday run, etc.

Risk Arrays, Risk Scenarios, Composite Deltas, scan Points and Delta Points

Risk Arrays

A risk array is a set of numbers defined (a) for a particular contract, (b) at a particular point in time, (c) to be margined for a particular business function, (d) associated with a particular account type, and (e) a particular requirement level, performance bond class and initial or maintenance designation, associated with that account type of item (d).

Each risk array value specifies how a single long or short position will lose or gain value if the corresponding risk scenario occurs over the specified look-ahead time. By convention, losses for long positions are expressed as positive numbers, and gains as negative numbers.

Lookahead Time

The lookahead time reflects the amount of time in the future from the current time, for which the SPAN requirement levels are intended to protect against declines in portfolio value. Lookahead time is a parameter of SPAN and may be set to any desired value. There may be two methods which can be utilized to determine or calculate the lookahead time, these methods are discussed below.

Actual Time to the Next Business Day

The Actual time to the next business day method determines the number of calendar days from the current business day to the next business day. The difference between these twp date may then be divided by 365 days per year to determine the lookahead time in years.

Average Time Per Business Day

The average time per business day method determines the lookahead time as one business day in a business year. The business year may be assumed to have 250 business days per year, or 0.004 years.

Use of actual time to the next business day closely protects against the risk of larger changes in portfolio value over weekends and holidays, and may result in increased portfolio performance bond requirements on the business day prior to a weekend, especially a holiday weekend. If, however, it is desired to avoid having the performance bond requirement fluctuate merely because of weekends and holidays, use of average time per business day is more appropriate.

Risk Scenarios

A risk scenario may be defined based on, for example, the following terms: (a) the (underlying) price movement, (b) the (underlying) volatility movement, and (c) the weight, also called the covered fraction.

For futures, physicals and other non-option product types, these are the price movement and volatility movement for the instrument itself. For options, these are the price and volatility movements for the underlying instrument. The values of the price movement, the volatility movement, and the covered fraction are determined by the scan point definitions and the two scan ranges, e.g., the price scan range and the volatility scan range. These values are the key inputs to SPAN.

Scan Point Definitions:

Each scan point definition may consist of: (a) the price scan magnitude, as the number of price scan ranges up or down, for example, 0.3333 or −2.000 (meaning one third of the price scan range up, or twice the price scan range down), (b) the volatility scan magnitude, as the number of volatility scan ranges up or down, for example, 1.0000 or −1.000 (meaning the full volatility scan range up or down), (c) the weight.

The price scan magnitude may itself be expressed in terms of a price scan numerator, a price scan denominator, and a price scan direction. For example, a price scan magnitude of −0.3333 may be expressed as a numerator of one, a denominator of three, and a direction of down. Similarly, the volatility scan magnitude may be expressed in terms of a volatility scan numerator, a volatility scan denominator, and a volatility scan direction.

Calculation Of Risk Array Values:

Generally, each risk array value may be calculated as: (a) the current value of the contract, (b) less the hypothetical future value of the contract, after the look-ahead time has passed, and (underlying) price and volatility movements associated with the risk scenario have occurred (d) multiplied by the weight.

For futures, physicals and certain types of combinations, this change in value is determined by the price change alone. To determine the hypothetical future value for options, the underlying price change, underlying volatility change, decrease in time to expiration, and the associated interest rates must also be taken into account, and a theoretical price calculated using an option pricing model.

In order to ensure that biases in the option pricing model do not affect the result, the current value may also be calculated using the same option pricing model, assuming the current time to expiration, current underlying price, and current underlying volatility. In other words, the risk array value for an option is determined by subtracting the hypothetical future theoretical value of the option, from the current theoretical value of the option. The actual model selected, the parameters of the model, the interest rates, and the look-ahead time are all parameters of SPAN.

Composite Delta and Delta Point Definitions:

The composite delta value is associated with each risk array defined for a contract. The composite delta is a probability-weighted average of a set of deltas calculated for the contract (a) after the look-ahead time has passed and (b) according to the scenarios defined by the definition of the delta points. Delta points are defined exactly analogously to scan points, with a price scan magnitude, a volatility scan magnitude, and a weight. Suppose, for example, that there are seven delta points defined. Seven delta values are calculated for the contract, using the price scan magnitude and the volatility scan magnitude associated with each delta point, and assuming that the look-ahead time has passed. A weighted average of these deltas is then taken; using the weights specified in the delta point definitions. In effect, a composite delta value represents an estimate of what the contract's delta will be after the look-ahead time has passed.

Overall Span Process:

To calculate SPAN requirements for a particular portfolio defined at a particular point in time, in which particular business functions for particular exchanges or clearing organizations are represented, the SPAN process: (1) obtains, loads or otherwise utilizes the applicable SPAN risk parameter file(s), (2) utilizes the SPAN algorithm in conjunction with the positions in the portfolio and the data contained in the SPAN risk parameter files. The results of steps (1) and (2) yields the requirement(s): (a) for the specific account type, (b) for each combined commodity of each business function represented in the portfolio, and (c) for each combined commodity, for each applicable requirement level (performance bond class, initial or maintenance designation).

Determine (Direct and Indirect) Requirement levels for a Portfolio

For a combined commodity in a portfolio of a particular account type, it is necessary to select the set of performance bond requirement levels (e.g., unique combinations of performance bond class and initial or maintenance designation) for which SPAN requirements should be calculated, directly or indirectly. A directly calculated SPAN requirement is a requirement, at a particular performance bond requirement level, for which the full SPAN calculation is done (e.g., scanning, spreading, etc). An indirectly calculated requirement is one that is derived from another requirement, at a different requirement level, by the application of a simple multiplicative scaling factor. Indirectly calculated requirements are also known as derived requirements. The selection of the set of requirement levels to be directly calculated, for a particular combined commodity in a portfolio, is driven by the set of requirement levels represented in the risk arrays for the products in that combined commodity. In particular, this is driven by which set of requirement levels are present for which account types. If there are risk arrays for this combined commodity for the particular account type of the portfolio, then these are the ones that determine the requirement levels to be directly calculated.

Risk Adjustment Factors and Derived Requirements

For each combined commodity, any number of risk adjustment factors may be provided in the SPAN risk parameter file. Risk adjustment factors may be used either to adjust requirements at directly calculated risk levels, or to derive requirements at other risk levels (indirect calculation.) Each risk adjustment factor has the following defined for it: (a) the account type to which it pertains, (b) the base requirement level, e.g., the requirement level, performance bond class and initial or maintenance designation, which will be used to derive another one, (c) the target requirement level which may be adjusted or derived, and (d) the value of the factor.

To apply a risk adjustment factor, multiply the requirement at the base level by the value of the factor. Adjustment factors used to derive an initial requirement for a particular performance bond class from a maintenance requirement for that class are also known as initial to maintenance ratios.

Summarized Span Calculation

A directly-calculated SPAN requirement at a particular requirement level for a combined commodity in a portfolio is calculated as: (1) sum the scan risk, the intracommodity spread risk, and the delivery (spot) risk, (2) subtract the intercommodity spread credit, and (3) take the larger of this result, and the short option minimum.

Scan risk is considered the risk for a combined commodity in a portfolio, assuming perfect correlations in price and volatility movements of the underlying instruments over time.

The intracommodity spread risk allows the recognition of risk associated with spreading within the combined commodity for combined commodities where there is imperfect correlation of price and volatility movements over time, and allows precise targeting of these requirements to particular intracommodity strategies.

The delivery, or spot risk, recognizes the unique risk characteristics of physically deliverable products, and of derivatives based on such physically deliverable products, as they approach the delivery period or go through the delivery process.

The intercommodity spread credit provides appropriate credits recognizing risk offsets between positions in the different combined commodities represented in the portfolio.

The short option minimum recognizes the unique characteristics of short option positions, and allows the recognition of a minimum risk value for deep out-of-the-money short options.

The sum of the scan risk, intracommodity spread risk, and the delivery risk is often referred to as the commodity risk, e.g., it is the risk for the combined commodity in the absence of any credits for intercommodity spreading.

The result obtained by subtracting the intercommodity spread credit from the commodity risk is often referred to as the pre-SPAN risk. This is a directly calculated SPAN requirement, assuming that the short option minimum requirement is less.

Clearing Organizations, Exchange Groupings, and Product Families

At the highest level, products are cleared by clearing organizations. Each clearing organization may have one or more exchange groupings defined for it. Within each exchange grouping, products are grouped into product families. Generally, a product family is identified within an exchange grouping by a product code such as an alphanumeric value, and a product type such as futures, options on futures, etc. Each product family is also assigned a product family ID number that is unique within the clearing organization and may be unique within the exchange grouping.

Product families may be defined in as specific a manner as desired. For example, other parameters used to make product families unique include the settlement method (cash-settled or physically deliverable), the valuation method (futures-style or equity-style), the settlement currency, and, for options, the exercise style (American or European). Contract size may also be used to define separate product families.

Contracts

In SPAN, tradable instruments, whether derivative or non-derivative, are generically referred to as contracts or as products. Contracts are grouped together in product families, and product type is always one of the things that makes a product family unique.

Product Types and Underlying Product Types

Product types may be for physicals or derivatives and, if the latter, for combination or non-combination products. Each contract (product) which is not a physical of one or another type is classified as a derivative, and has one or more underlying contracts. Derivative products that have exactly one underlying contract are known as non-combination derivatives. Derivative contracts that have two or more underlying contracts are generically known as combinations. Each such underlying is referred to as a leg of the combination. Swaps, repos and reverse repos are recognized as subtypes of the combination type.

Contract Structure and Contract Underlying Ratios:

The set of underlying contracts for a derivative product is known as its contract structure. Each element in the set specifies: (1) the specific underlying contract; and (2) the underlying ratio for this specific underlying contract. Underlying ratio may be defined for any contract X which is not a physical: and for each of its underlying contracts Yi:

The underlying ratio is the number of units of that underlying Yi which are bought (or sold) per one long position of the contract X, expressed as a positive number if buying, or a negative number if selling.

In other words, the underlying ratio informs: (1) whether buying the derivative means buying or selling this specific underlying contract; and (2) how many of the specific underlying are bought or sold per purchase of one derivative contract.

Contract Price and Contract Value Calculations

Every contract, at every point in time, has a contract price associated therewith. For exchange-traded instruments, for SPAN being used as an end-of-day tool for calculating performance bond (margin) requirements, this will be the end-of-day settlement price. At other points in time (e.g., during the trading day) this may be an intraday theoretical price. SPAN uses the price of a contract to determine the monetary value of a single position in that contract, e.g., the contract value. This monetary value is expressed in the settlement currency for the contract, also called the price quotation currency.

To calculate contract value multiply the contract price by the contract value factor for the contract. The contract value factor is the multiplier, which converts a quoted price for the contract into its monetary value in the contract's settlement currency. The contract value factor may be derived from the specification of the contract size and the convention used for quoting prices.

Contract Periods

The concept of contract period denotes products with different maturities or expirations. Contract period can be thought of as a generalization of the contract month concept. All contracts (except those that are margined on an equivalent basis) have a contract period code defined. A contract period code may have, for example, the following structure: (1) a four-digit year number, for example, 1999; (2) a two-digit month number, for example, 05 for May; and, if needed, (3) a two-byte string which may be used to further qualify the period.

Option Series

An option series in SPAN 4 consists of all options with the same expiration and the same underlying. Standard options within a series differ from each other only in their strike price and their option right (e.g., puts or calls). For more exotic options, they may also be distinguished by one or more barrier prices.

Participation of product families in business functions: A product family is said to participate in a particular business function, if it has been assigned to one of the combined commodities defined for that business function. Every product family always participates in the normal clearing business function for its clearing organization. It may, but is not required to, participate in additional business functions.

Combined Commodities and Delta Periods

The products assigned to a combined commodity determine an array of delta periods defined for that combined commodity. Each contract is mapped into a specific delta period, and delta periods in turn are mapped into tiers.

Tiers and Tiered Processing

A tier in SPAN is a contiguous range of delta periods within a combined commodity. To provide flexibility, tiered processing is supported for scan rate tiers (the specification of tiers for defining price scan ranges and volatility scan ranges), scanning tiers, intracommodity spread tiers, intercommodity spread tiers, and short option minimum rate tiers. Specific tiers for a combined commodity are identified by a tier number beginning with one, and are further qualified by a beginning period code and an ending period code. The ending period code must be greater than or equal to the beginning period code, and the delta periods for the different tiers never overlap.

For intra- and inter-commodity spreading, sometimes there are cases where more than one tier is defined, but it is desired in a particular leg of a spread to reference the entire combined commodity, across all tiers. To support this, SPAN recognizes for each combined commodity an intracommodity spread tier zero and an intercommodity spread tier zero, which are defined as the range of period codes for the entire combined commodity, crossing individual tiers. This may also be referred to as the overall tier.

Mapping Each Delta Period into its Tier

For a given tier type for a combined commodity, to determine the tier into which a delta period maps: (1) compare the delta period code with the beginning period and the ending period, and (2) if the delta period code is greater than or equal to the beginning period, and less than or equal to the ending period, then it maps into that tier.

Portfolios to be Margined

As described above, a portfolio of positions to be margined using SPAN is held in an account. Each such account has a specific account type. Portfolios may be defined at either the clearing-level or the customer-level. In other words, they are either for a specific performance bond account of a clearing member firm of a clearing organization, where the margin calculation is being done by that clearing organization, or they are for a specific customer-level account of a member firm or other trading firm, where the margin calculation is being done by that firm. A clearing-level portfolio always holds positions for a single business function of that clearing organization, while any number of business functions and clearing organizations may be represented in the positions for a customer-level portfolio.

Position Definition

A position within a portfolio to be margined at a particular point in time, is defined by: (a) the time at which the portfolio exists, (b) the portfolio in which the position is contained, specified as the firm identifier, the account identifier, the account type (including whether this is a clearing-level or firm-level account), and the segregation type, (c) the contract in which the position is held, and the business function for which the contract is to be margined, and (d) the position quantity number(s).

Gross and Net Position Management

A gross position is one that may be simultaneously long and short. A net position is one that is never simultaneously long and short. In other words, a net position is one that is determined by netting together the beginning position for the day with all buys and sells for that day. For net positions, all trades are liquidating to the extent possible. A gross position is determined by the beginning of day position and, for each trade done for that day, whether it was an opening (new) or closing (liquidating) transaction. At the firm-level, accounts are commonly kept net, with two typical exceptions: (1) omnibus accounts, discussed below, and (2) certain types of hedger accounts. At the clearing level, positions are typically kept gross for accounts which themselves are aggregates of more than one account at the firm level, in order to reflect true open interest.

Net Margining

At the firm-level and often at the clearing-level, portfolios are typically "net margined." This is also typically called "calculating a net requirement." This means two things: (1) If the position is kept gross (e.g., if the position may be simultaneously long and short) then it is first netted before being processed. Only the portfolio of net positions is margined. And (2), no restrictions are placed on the recognition of risk offsets between different parts of the portfolio.

Since SPAN does recognize all allowable risk offsets, as they are defined in the SPAN risk parameter file and as they are present in the portfolio, "net margining" translates into, process a portfolio of net positions via SPAN. Note that there is a distinction between gross and net position keeping, and gross and net margining: A position may be simultaneously kept gross, while being margined net. This is sometimes the case for certain types of hedge customer accounts.

Omnibus accounts and levels of disclosure; gross margining at firm level: An omnibus account is an account of one firm on another firm's books, which account is itself comprised of a number of individual accounts on the first firm's books. The firm with the omnibus account is said to carry the omnibus account on its books, and is often called the "carrying firm." The individual accounts on the first firm's books are said to be "subaccounts" of the omnibus account. Because an omnibus account is comprised of any number of subaccounts, omnibus account positions must be kept gross. Any given position in any omnibus account may itself be the sum of a number of subaccount positions, some of which may be long and some of which may be short. If the omnibus account is "fully disclosed" to the carrying firm which must calculate a margin requirement for it, this means that it has informed the carrying firm of each individual subaccount and what its positions are. Depending on business practices, this may not mean that it has identified the owner of each subaccount, but rather simply that it is has specified which sets of positions belong to single owners. In this case, the carrying firm typically calculates a net requirement for each subaccount, and the total omnibus account requirement is simply the sum of the subaccount requirements. On the other hand, an omnibus account portfolio may be only "partially disclosed", or "non-disclosed." If partially disclosed, the omnibus account has provided information to the carrying firm about some sets of subaccounts, but not of all. If non-disclosed, no information is provided about the subaccounts and which positions they hold.

The portion of each gross omnibus account position which is not held in disclosed subaccounts, is typically said to be "naked". In other words, for each position—total long and total short—there is a naked portion—the naked long and naked short. These naked positions are typically "gross margined." This means that (a) a separate SPAN requirement is calculated for each naked long position quantity, and for each naked short position quantity. Because each such position quantity is in a single contract, and is only on one side of the market, there are no risk offsets recognized in such requirements. And (b) that the total requirement for the naked portion of the account portfolio is the sum of all of these individual naked long and naked short requirements.

If the omnibus account is partially disclosed, its total requirement is the sum of all of the net requirements for the subaccounts, plus the sum of all of the individual naked long and naked short requirements for the naked positions.

Gross-Margining at the Clearing Level

At the clearing-level, the overall term "gross margining" is used to refer to a business practice where: (1) Positions are kept gross, e.g. may be simultaneously long and short; (2) Some portion of the total long and total short for each position is broken out, and margined net. This portion is termed the fully inter-commodity spreadable long and short, and is often referred to as the "intercommodity spreadable," the "inter-spreadable" long and short, or the "inter positions"; (3) Another portion of each total position is broken out, and margined net, except that no risk offsets are recognized among the different combined commodities in the portfolio, e.g., no intercommodity spreading is done. This portion is termed the "intracommodity spreadable", the "intra-spreadable" or the "intra positions"; (4) The remaining portion is considered naked, and margined gross.

Some portion of the total positions may be deemed to be spreadable both within commodities and between commodities, while another portion to be spreadable only within commodities but not between commodities, and a final portion to be spreadable not at all. The total requirement for each combined commodity in the clearing-level portfolio is then determined from the various components of the SPAN requirements calculated for these different position types. So at the clearing-level, "gross margining" doesn't mean that positions are fully gross margined, but rather that some portion of the overall positions may be.

Clearing-level gross margining is typically used for customer-origin performance bond accounts where the clearing-level positions are determined by aggregating positions across many individual customer accounts. Typically, the positions within each customer account are inspected to determine whether risk offsets exist both within and between commodities, or only within commodities, or not at all. Based on this inspection, the customer's positions are classed as inter-spreadable, inter-spreadable, or naked. The total clearing-level inter-spreadable long and short positions, then, are calculated as the sum of the customer positions that were classed as inter-spreadable, and analogously for the intra-spreadable positions.

Position Accounts, Performance Bond Accounts, Margin Dispositions, and Positions to be Margined At the clearing-level, it is possible for a distinction to be drawn between the position accounts in which positions are kept, and the performance bond accounts in which they are margined. In this case, there may be a great deal of flexibility in how positions roll up from position accounts to performance bond accounts. For example, positions in products eligible for participation in a particular cross-margin agreement may be routed to a performance bond account specifically for that cross-margin business function, whereas positions in other products, not eligible for this cross-margin agreement, are routed to a performance bond account specified as being for the normal business function. Even within a particular position, if that position is eligible for more than one business function, the position itself may be broken down into any number of "positions to be margined", or "dispositions", each of which is designated for a particular performance bond account and hence to be margined via the SPAN parameters for a specific business function.

Within each disposition, the position-to-be-margined may be margined either "gross" or net. If "gross", each total position-to-be-margined is further broken down into an inter-spreadable long and short, an intra-spreadable long and short, and a naked long and short. If "gross", as described above, the inter-spreadable positions are margined net, the intra-spreadable positions are margined net but without allowing inter-commodity spreading, and the naked positions are truly margined gross.

The Span Calculation for Net Portfolios

This section includes the description of the algorithm for calculation of a SPAN risk requirement for each combined commodity represented in a portfolio to be margined on a net basis ("net portfolio"). This may be either a customer-level portfolio or a clearing-level portfolio.

Position Processing

Position processing in SPAN consists of processing each position within each combined commodity represented in the portfolio, for the purposes of:

Scanning: scaling up the risk array(s) for the contract by the position quantity, and incrementing the overall risk array(s) by these scaled-up risk array(s)

Delta calculation: scaling up the SPAN composite delta(s) for the contract by the position quantity, and incrementing the overall position delta(s) for the associated delta period by these scaled-up composite delta(s)

Short option minimum calculation: determining the effect of the position on the quantity for determination of the short option minimum charge (also called the minimum commodity charge).

Position value calculation: evaluating the current monetary value of each position, and incrementing the overall current monetary values for the combined commodity, broken out by whether the position is long or short and by whether the contract is valued futures-style or premium-style.

Position Types for the Position Value Calculations:

Products can be categorized by whether their valuation method is futures-style or premium-style: (1) for futures-style products, there is a daily mark-to-market for open positions, and the resulting settlement variation amounts are paid or collected daily. (2) For premium-style products, the full trade price (premium) is paid or collected when the position is opened.

Futures contracts, of course, are valued futures-style; the daily mark to market and the daily payment or collection for settlement variation (sometimes called "variation margin") is what distinguishes them from a forward contract. Option positions are typically valued premium-style, but some exchange-traded options are valued futures-style.

The significance of whether a position is valued premium-style is as follows: If a position is valued premium style, and if the full value of the premium is considered to have been paid (or collected), then the current value of the position is counted as a collateral asset (if long) or a liability (if short). For the positions in each combined commodity represented in the portfolio, then, it is necessary to determine the value of those positions broken out the following ways: (1) by whether the positions are valued futures-style or premium-style; (2) by whether the position quantities are long or short; (3) by whether the positions are in options or are not in options.

In other words, for each combined commodity in the portfolio, we will have determined:
value of long non-option positions in products valued futures-style;
value of short non-option positions in products valued futures-style;
value of long option positions in products valued futures-style;
value of short option positions in products valued futures-style;
value of long non-option positions in products valued premium-style;
value of short non-option positions in products valued premium-style;
value of long option positions in products valued premium-style; and value of short option positions in products valued premium-style.

Note that in some cases, the exchange or clearing organization using SPAN may establish a business rule regarding the timing of the recognition of value for premium-style products.

Special position-processing features: In addition to regular position processing, SPAN supports several special position-processing features which provide additional power and flexibility: (1) split allocation is typically used for positions in combinations and/or options on combinations where the underlying instruments of the combination are in different physical commodities, the position in the combination or the option on the combination, is split out (allocated) into positions on the underlying instruments of the combination. (2) Delta-Split Allocation is typically used for positions in combinations and/or options on combinations where the underlying instruments of the combinations are at different expirations within the same physical commodity, similar to regular split allocation, but differs in that only the delta from the position in the combination or the option on the combination, is split out to the delta periods of the underlying legs. (3) Equivalent Positions is used when it is desired to margin a position in one instrument, as one or more equivalent positions in other instruments.

Expression of Net Position Numbers

For positions in a net portfolio, position quantities are expressed as signed numbers, positive for a net long position, and negative for a net short position. Depending on the types of instruments in the portfolio and the conventions used for expressing their positions, it is possible for position quantities to be fractional (e.g., not whole numbers).

Pre-Processing for Margining Debt Securities on an Equivalent Basis

For positions in physical debt securities, which are being margined on an equivalent basis, it may be necessary to perform special pre-processing to express the position quantities properly, even before the transformation of the debt securities position into its equivalents. This section describes that pre-processing. For government debt securities to be margined on an equivalent basis, positions should be expressed in units of thousands of par value currency units in the currency of denomination. Positions to be margined in such physical debt securities are those resulting from not-yet-settled trades. The actual position in such securities can sometimes be broken out as the sum of: 1) the net position from open outright trades, and 2) the net position from open repos (or reverse repos) in which the on-leg has settled but the off-leg has not yet settled, with a net repo position expressed as a positive number and a net reverse repo position expressed as a negative number. Such repos are referred to as same-day repos when they are entered into (and margined), since on the day they are entered into, the on-leg settles, leaving only the unsettled off leg to be margined.

Repo and reverse repo positions where neither leg has settled are typically considered to be next-day repos. In other words, the repo is entered into today, with the on-leg beginning tomorrow. Since the on-leg and the off-leg are both not-yet-settled, these obligations cancel each other out. So these next-day repo or reverse repo positions are not included in the margin calculation.

Processing Split-Allocation Positions

After transforming any positions to be processed on an equivalent basis into their equivalents, the next step in position processing is to deal with any positions that are to be handled using the split allocation method. Split allocation is typically used for positions in options on futures intercommodity spreads. The method is generically applicable, however, to any combination product or option on combination product. The specification of whether split allocation is to be performed is done for a product family linked into a combined commodity. Not all product families linked into a combined commodity need be processed using split allocation. In general, however, for the algorithm to yield the desired results, split allocation should be specified for both the options on the combination, and the combination itself. Typically both of these product families will be placed into the same combined commodity.

Determining Position Quantities for Further Processing

With positions to be processed on an equivalent basis transformed into their equivalents, and positions to be processed via split allocation, allocated out to their underlyings, we're now ready to determine the position quantities to be carried forward in SPAN.

The following applies to all position types except positions processed on an equivalent basis. (As explained above, such positions play no additional role in the calculations once they have been transformed into their equivalents.) The algorithm will evaluate five different values for each position: (1) the total position; (2) the marginable position; (3) the position for valuation; (4) the position for scanning and (5) the positions for the short option minimum calculation, the number of short calls and the number of short puts.

For each position in the portfolio, the total position is equal to the sum of the position in the contract itself, the equivalent position, and the position resulting from split allocation. The marginable position is equal to the total position times the contract-scaling factor. The position for valuation is the sum of the position in the contract itself and the rounded position resulting from equivalents. The position for scanning is determined as follows: (1) If the product family for this position is processed either normally or via delta-split-allocation, take the marginable position; and (2) If the product family for this position is processed via split allocation, take zero.

The positions for the minimum commodity charge are determined as follows: if this position is not for an option, then the number of short calls and the number of short puts are both zero. But if this position is for an option: If the marginable position is zero or positive, then the number of short calls and the number of short puts are both zero. But if the marginable position is negative: If the option is a call, the number of short calls is equal to the absolute value of the product of the marginable position and the delta-scaling factor. The number of short puts is zero. If the option is a put, the number of short puts is equal to the absolute value of the product of the marginable position and the delta-scaling factor. The number of short calls is zero.

Determining the Position Value

For each combined commodity in the portfolio and for each position in the portfolio: (1) take the position for valuation as determined above; (2) Multiply this result by the value of a single contract, yielding the value of the position in the settlement currency for the contract; (3) If the performance bond currency for the combined commodity in which the product is contained is different from the settlement currency of the product, convert the value from the settlement currency to the performance bond currency, rounding as may be needed to the normal precision of the performance bond currency. This yields the value of the position in the performance bond currency for the combined commodity.

Determining the Liquidation Risk Position Value

The Liquidation Risk calculation is a method of determining the Scan Risk, which has been introduced in SPAN for the Paris Bourse (SBF.) This calculation requires the determination of a special position value called the Liquidation Risk Position Value. As can be seen, this differs from the regular position value in that (a) it includes any position quantity resulting from split allocation, and (b) for positions in debt securities, it is adjusted for the duration of the security. For each combined commodity in the portfolio for which "liquidation risk" has been specified as the method for determining the scan risk:

For each position for products linked into this combined commodity: (1) Take the position for scanning, as determined above; (2) If this position is in a debt security, multiply this value by the duration of that security, expressed in years. (3) Multiply this result by the value of a single contract; (4) If the performance bond currency for the combined commodity in which the product is contained is different from the settlement currency of the product, convert this value from the settlement currency to the performance bond currency. (5) Round this result as specified. (The rounding convention used by SBF for liquidation risk position value is to round down, toward zero, to five decimal places.) The result is the liquidation risk position value.

Determining the Currency Conversion Rates for the Intercurrency Risk Scanning Feature of the Scan Risk Calculation Intercurrency risk scanning is an optional feature of the scan risk calculation which may be applied in cases where there are products whose settlement currency is different from the performance bond currency of the combined commodity into which they are linked. When a product family is linked into a combined commodity, it may be specified that intercurrency risk scanning is applicable. If intercurrency risk scanning is specified, then the risk array values for that product family linked into that combined commodity are denominated in the settlement currency for that product family. For each such settlement currency and performance bond currency pair, it is necessary to determine the exchange rate up and the exchange rate down: (1) For a given settlement currency and performance bond currency pair, read the intercurrency scan rate up and the intercurrency scan rate down. (These are provided in the London format SPAN file on the currency conversion rate record for that currency pair.) Express these values as decimal fractions. If the settlement currency is equal to the performance bond currency, take zero for these values. (2) Take the exchange rate multiplier, which converts a value in the settlement currency to one in the performance bond currency. If the settlement currency is equal to the performance bond currency, take one for this value. (3) Multiply the exchange rate by the value of one plus the intercurrency scan rate up, yielding the exchange rate up. (4) Multiply the exchange rate by the value of one minus the intercurrency scan rate down, yielding the exchange rate down.

Determining the Scaled-Up Risk Array(s) and Delta(s) for the Position:

For each combined commodity in the portfolio for which scanning is being performed normally (not using the "liquidation risk" scanning method): For each product family in this combined commodity and for each position in this product family: (1) Take the position for scanning as determined above. (2) For each directly calculated requirement level for this portfolio type and combined commodity: (i) Take the risk array for this product as linked into this combined commodity and for this requirement level. (ii) Multiply each element in the risk array by the position for scanning, yielding the scaled-up risk array for the position. (iii) If the intercurrency risk scanning feature is enabled for this product family: (a) Multiply each element in the scaled-up risk array by the exchange rate up for this settlement currency/performance bond currency pair, yielding the scaled-up converted-up risk array. (b) Multiply each element in the scaled-up risk array by the exchange rate down for this settlement currency/performance bond currency pair, yielding the scaled-up converted-down risk array. (iv) To determine the position delta: (a) Take the composite delta for this product as linked into this combined commodity and for this requirement level. (b) Multiply the position for scanning by the composite delta and then by the delta-scaling factor.

Aggregation of position values to the combined commodity: For each combined commodity in the portfolio and for each position in the combined commodity: (1) take the position value as calculated above; and (2) using the position value, increment one of eight value buckets for the combined commodity determined according to whether: (a) The position value is long (positive) or short (negative); (b) the position is for an option or a non-option; (c) the position is valued futures-style or premium-style.

Aggregation of Short Option Positions

For each combined commodity in the portfolio, for each position in the combined commodity and for each short option minimum rate tier for the combined commodity: (1) Increment the number of short calls for the overall tier by the number of short calls for the position as calculated above; and (2) Increment the number of short puts for the overall tier by the number of short puts for the position as calculated above.

Determining the Number of Short Option Positions for a Tier

If the short option minimum charge method for the combined commodity is gross: (1) take the sum of the number of short calls for the tier and the number of short puts for the tier; and (2) If the short option minimum charge method for the combined commodity is maximum, take the larger of the number of short calls for the tier and the number of short puts for the tier.

Determining the Short Option Minimum Charge:

For each combined commodity in the portfolio, for each directly calculated requirement level, and for each short option minimum rate tier: (1) determine the number of short option positions for the tier; (2) multiply by the short option minimum charge rate to yield the charge for the tier; and (3) take the sum of the charges for the specific tiers, yielding the overall charge for the combined commodity.

Aggregation of scaled-up risk array values to the scanning tier(s) and the intercommodity spread tier(s): For each combined commodity in the portfolio for which scanning is being performed normally (not using the "liquidation risk" scanning method), for each position in the combined commodity and for each directly calculated requirement level for the portfolio: (1) if intercurrency risk scanning is not enabled for the product family for this position in this combined commodity: (a) Increment each element in the overall scanning tier risk array, by the corresponding element in the scaled-up risk array for the position. (b) If there are specific scanning tiers for the combined commodity, select the specific scanning tier in which this product is contained, and increment each element in the risk array for the specific tier, by the corresponding element in the scaled-up risk array for the position. (c) Increment each element in the overall intercommodity spread tier risk array, by the corresponding element in the scaled-up risk array for the position. (d) If there are specific intercommodity spread tiers for the combined commodity, select the specific intercommodity spread tier in which this product is contained, and increment each element in the risk array for the specific tier, by the corresponding element in the scaled-up risk array for the position. (2) But if intercurrency risk scanning is enabled for the product family for this position in this combined commodity: (a) Increment each element in the overall scanning tier exchange rate up risk array for this settlement currency/performance bond currency pair, by the corresponding element in the scaled-up exchange rate up risk array for the position. (b) Increment each element in the overall scanning tier exchange rate down risk array for this settlement currency/performance bond currency pair, by the corresponding element in the scaled-up exchange rate down risk array for the position. (c) If there are specific scanning tiers for the combined commodity, select the specific scanning tier in which this product is contained, and: (i) Increment each element in the exchange rate up risk array for the specific tier for this settlement currency/performance bond currency pair, by the corresponding element in the scaled-up exchange rate up risk array for the position. (ii) Increment each element in the exchange rate down risk array for the specific tier for this settlement currency/performance bond currency pair, by the corresponding element in the scaled-up exchange rate down risk array for the position. (d) Increment each element in the overall intercommodity spread tier exchange rate up risk array for this settlement currency/performance bond currency pair, by the corresponding element in the scaled-up exchange rate up risk array for the position. (e) Increment each element in the overall intercommodity spread tier exchange rate down risk array for this settlement currency/performance bond currency pair, by the corresponding element in the scaled-up exchange rate down risk array for the position. (f) If there are specific intercommodity spread tiers for the combined commodity, select the specific intercommodity spread tier in which this product is contained, and: (i) Increment each element in the exchange rate up risk array for the specific tier for this settlement currency/performance bond currency pair, by the corresponding element in the scaled-up exchange rate up risk array for the position. (ii) Increment each element in the exchange rate down risk array for the specific tier for this settlement currency/performance bond currency pair, by the corresponding element in the scaled-up exchange rate down risk array for the position.

Aggregation of position delta to the delta periods: For each combined commodity in the portfolio for which scanning is being performed normally (not using the "liquidation risk" scanning method), for each position in the combined commodity, and for each directly-calculated requirement level for the combined commodity: (1) Take the position delta. (If the position is being processed via split allocation, the position delta will be zero and there is no need to continue.) (2) If the product is processed normally, increment the period delta for this requirement level and for the delta period containing this contract, by this position delta.

If the product is processed using delta-split-allocation, allocate the position deltas out to the underlying(s) initialization of tier deltas. For intracommodity spread tiers, for each combined commodity in the portfolio, for each directly calculated requirement level, and (1) for each intracommodity spread tier: (a) Initialize the total long delta for the specific tier by taking the sum of all period deltas contained within the tier which are positive (e.g., net long.) (b) Initialize the total short delta for the specific tier by taking the sum of all period deltas contained within the tier which are negative (e.g., net short), and then by taking the absolute value of this result. (2) For the overall tier: (a) Initialize the total long delta for the overall tier by taking the sum of the total long deltas for the specific tiers. (b) Initialize the total short delta for the overall tier by taking the sum of the total short deltas for the specific tiers.

For intercommodity spread tiers, for each combined commodity in the portfolio, for each directly calculated requirement level and (1) for each intercommodity spread tier: (a) Initialize the total long delta for the specific tier by taking the sum of all period deltas contained within the tier which are positive (e.g., net long.); (b) Initialize the total short delta for the specific tier by taking the sum of all period deltas contained within the tier which are negative (e.g., net short), and then by taking the absolute value of this result. (c) Net these two results against each other: subtract the total short delta from the total long delta. If the result is positive, store it as the total long delta and set the total short delta to zero. If the result is negative, take its absolute value, store it as the total short delta, and set the total long delta to zero. (2) For the overall tier: (a) Initialize the total long delta for the overall tier by taking the sum of the total long deltas for the specific tiers. (b) Initialize the total short delta for the overall tier by taking the sum of the total short deltas for the specific tiers. (c) Net these two results against each other: subtract the total short delta from the total long delta. If the result is positive, store it as the total long delta and set the total short delta to zero. If the result is negative, take its absolute value, store it as the total short delta, and set the total long delta to zero.

Determining the Scan Risk and Related Values for Scanning and Intercommodity Spreading Tiers:

For each combined commodity in the portfolio for which scanning is being performed normally (not using the "liquidation risk" scanning), For the overall scanning tier, for the overall intercommodity spreading tier, for each specific scanning tier if there are any, and for each specific intercommodity spreading tier if there are any, and for each directly calculated requirement level: (1) if intercurrency risk scanning was enabled for any product family in this combined commodity:

(a) for each settlement currency/performance bond currency pair for this combined commodity represented among the set of product families for which intercurrency risk scanning was enabled: (i) compare each element in the exchange rate up array with the corresponding element in the exchange rate down array. For each element, select the larger value (more positive or less negative), thereby yielding the overall risk array for this tier and currency pair. (b) Sum the overall risk arrays for the various currency pairs for the tier, together with the array for the tier for products for which intercurrency risk scanning was not enabled (if any), thereby yielding the overall risk array for the tier.

(2) Select the largest (most positive) value in the risk array. This is the largest loss for the tier, and the corresponding risk scenario is called the active scenario. For scanning tiers only, this value is also called the scan risk for the tier. For intercommodity spread tiers only: (a) Select the risk array value with the same definition for price movement as the active scenario, but the opposite definition of volatility movement. This is called the paired point. (b) Take the average of the risk array values for the active scenario and the paired point. Round this result as specified in the rounding convention for time and volatility risks for this exchange complex, yielding an estimate of the volatility risk for the tier. (c) Take the two risk array values with scenario definitions of (a) no price change and (b) opposite volatility changes. Take the average of these two values, yielding an estimate of the time risk for the tier. (d) Subtract the estimates of volatility risk and time risk from the scan risk, yielding an estimate of the price risk. (e) Calculate the weighted price risk for the tier via one of three weighted price risk calculation methods.

Determining the weighted price risk for an intercommodity spread tier: There are three methods for calculating the weighted price risk for an intercommodity spread tier: normal, normal with capping, and scanrange. If the method is normal: (1) Subtract the value of the short delta for the tier from the value of the long delta for the tier, yielding the net delta for the tier. (2) Divide the price risk for the tier by the net delta. (3) Take the absolute value of this result.

If the method is scanrange: (1) Select the first non-option contract within the tier that has a non-zero value for its price scan range. (2) Take that price scan range. (3) Divide that value by the product of the contract's contract scaling factor and delta-scaling factor. (This takes relative contract size differences into account, converting the value into one applicable to a "standard" sized contract.)

If the method is normal with capping: (1) Calculate the weighted price risk first via the normal method, and again via the scanrange method. (2) Take the smaller of these two values. (In effect, it is calculated normally, but its value is capped at the scan range.)

Determining the Scan Risk for the Combined Commodity: For each combined commodity within the portfolio for which scanning is being performed normally (not using the "liquidation risk" scanning method), and for each directly calculated requirement level for that combined commodity: (1) If there are any specific scanning tiers defined for the combined commodity: (a) the scan risk for the combined commodity is the sum of the tier scan risks for each specific scanning tier. (2) But if there is only the overall scanning tier for the combined commodity. (3) The scan risk for the combined commodity is the scan risk for that overall scanning tier.

Determining the Scan Risk and Setting Other Values for the Combined Commodity using the Liquidation Risk Method Each combined commodity for which Liquidation Risk has been specified as the processing method for scanning will contain only physical equity or debt securities which are considered to (a) be within the same security family and (b) have the same risk level.

Each such combined commodity will have only overall tiers defined for it for scanning, for intercommodity spreading, and for intracommodity spreading. Each such combined commodity will have precisely one intracommodity spread defined for it, a delta-based, one to one, overall tier 1 to overall tier 1 spread. The charge rate for this spread will be specified as a decimal fraction. Intercommodity spreads referencing this combined commodity will similarly reference the overall intercommodity spread tier, with a credit rate specified as a decimal fraction. For each combined commodity for which Liquidation Risk has been specified as the method for determining the Scan Risk: (1) Take the sum of the Liquidation Risk Position Values for all positions for which this value is positive. This yields the Long Liquidation Value. (2) Take the sum of the Liquidation Risk Position Values for all positions for which this value is negative. Then take the absolute value of this sum. This yields the Short Liquidation Value. (3) For each directly-calculated requirement level for this combined commodity: (a) Read the Liquidation Risk rates for this requirement level and combined commodity. There will be two values, the Specific Rate and the Generic Rate. (These are also referred to as the X-parameter and the Y-parameter, respectively, in the Paris Bourse documentation.) (b) Take the sum of the Long Liquidation Value and the Short Liquidation Value, and multiply this result by the Specific Rate. This yields the Specific Risk. (c) Take the absolute value of the difference between the Long Liquidation Value and the Short Liquidation Value, and multiply this result by the Generic Rate. This yields the Generic Risk. (d) Take the sum of the Specific Risk and the Generic Risk. (e)

Store the Long Liquidation Value as the Long Delta for the overall Intracommodity Spread Tier. (f) Store the Short Liquidation Value as the Short Delta for the overall Intracommodity Spread Tier. (g) Subtract the Short Liquidation Value from the Long Liquidation Value. If this result is zero or positive, store it as the Long Delta for the overall Intercommodity Spread Tier. If this result is negative, take its absolute value and store it as the Short Delta for the overall intercommodity spread tier. (h) Set the Weighted Price Risk for the overall intercommodity spread tier to 1.

Spreading

After determining the scan risk and the minimum commodity charge for each combined commodity in the portfolio, the next step is to perform spreading. As will be described below, the disclosed embodiments utilize the following spreading and hybrid spreading methodologies.

Spread Groups

The SPAN algorithm supports the definition of the groups of spreads, including: Super-intercommodity spreads, Intracommodity spreads, Pre-crossmargining spreads, Cross-margining spreads, Inter-commodity spreads, and Inter-clearing organization ("interexchange") spreads. Intra-commodity spreads are typically used to calculate charges to recognize the risk associated with spreads formed within a combined commodity. The scanning process assumes perfect correlation of price movements among the various products grouped together within a combined commodity.

Inter-commodity spreads are used to recognize risk offsets, and provide appropriate credits, between positions in related combined commodities. Inter-clearing organization spreads, often referred to as interexchange spreads, are used to recognize risk offsets and provide appropriate credits, between positions in combined commodities of different clearing organizations or other business functions of those clearing organizations. These are distinguished from normal intercommodity spreads in that each clearing organization involved in a particular spread is free to recognize or not recognize that spread, and to specify the particular credit rate applicable to its own products. This may be used when a clearing organization wishes to grant a reduction to the performance bond requirement for its own products when the risk of those products is reduced by offsetting positions on another clearing organization, regardless of whether any formal cross-margining agreement exists between those clearing organizations, and typically in the absence of any such agreement.

Super-intercommodity spreads are a new spread group created in order to allow the recognition of particular delta patterns across combined commodities, even before intracommodity spreading is performed. For example, this type of spread can be used to recognize a "tandem" relationship between two combined commodities (for the first combined commodity: long in one month, short in another; and for the second combined commodity: short in one month, long in another.)

Cross-margining spreads are a new group created in order to allow two or more clearing organizations which participate in a cross-margin agreement, to define spreads which are to be evaluated before normal intra- and inter-commodity spreading is done. The new pre-cross-margining spread group gives those same clearing organizations an opportunity to define spreads which are to be evaluated first, before the cross-margining spreading is done.

Spread Types

In addition to the spread group in which they are contained, spreads may be categorized by whether they are delta-based, scanning-based, or hybrid delta-based/scanning-based. Scanning-based spreads and hybrid spreads can only be used for the intercommodity spread groups—pre-crossmargin spreads, super-intercommodity spreads, and normal intercommodity spreads. Spreads in the groups that cross clearing organization and/or business function boundaries—the cross-margining spreads and the inter-clearing organization spreads—can only be delta-based.

Delta-Based Spreading

A delta-based spread is one that is formed on a delta-basis—e.g., according to the relative magnitudes and relationships of the remaining delta values for each of the legs of the spread. A delta-based spread may contain any number of spread legs. Spreads are typically two-legged, but three, four, five or more legged-spreads may occur. Each leg references a specific combined commodity, and for that combined commodity, one of: 1) an intercommodity spread tier; 2) an intracommodity spread tier, or 3) a delta period.

In addition, for each leg, a delta per spread ratio and a relative market side indicator are specified. The delta per spread ratio is a positive value, which indicates the amount of delta consumed for that leg via the formation of one spread. The relative market side indicator is either A or B, and indicates the relative relationship of the remaining deltas of the legs which must prevail in order for spreads to be formed. For example, for a typical two-legged A to B spread, either the remaining delta for the first leg must be positive and the second leg negative, or the remaining delta for the first leg must be negative and the second leg positive.

A delta-based spread also has defined for it a charge or credit method—either flat-rate, or weighted price risk. Flat-rate is typically used for intracommodity spreads. A charge for the spread is calculated by taking the number of spreads formed and multiplying by the charge rate. Weighted price risk is typically used for intercommodity spreads. For each participating leg, a credit for the spread is calculated by determining the total number of delta consumed by the spread, times the weighted price risk (which can be thought of as the price risk per delta), times the credit rate percentage. Accordingly, a delta-based spread also has defined for it one or more rates, depending on how many requirement levels are being directly calculated.

For an intracommodity spread using the flat-rate method, the rates are considered to be charge rates, and a normal, positive charge rate produces an intracommodity spread charge. A negative charge rate is allowed and would produce a negative charge—e.g., a credit.

Similarly, for an intercommodity spread using the weighted price risk method, a normal, positive credit rate percentage produces a positive credit amount. If a negative credit rate had been specified for the spread, this would yield a negative credit—(e.g., a charge).

Delta-based spreads using the flat rate method may have more than one combined commodity represented among their legs. If so, the resulting charge is apportioned to each leg according to the relative proportion of the absolute value of its delta per spread ratio. All such combined commodities participating in such a spread must accordingly share the same performance bond currency.

Spreads within Spreads

Sometimes it may be desired to use one delta-based spread to set a limit on the total number of spreads formed via a separate set of delta-based spreads. To handle these situations generically, delta-based spreads have been made recursive in SPAN. That is, a delta-based spread may contain a set (one or more) of delta-based spreads, each of which may contain a set (one or more) of delta-based spreads. There are no limits to the numbers of levels of such recursions. The spread at the top of such a hierarchy is called the top-level spread, and it is the one that contains the rate(s) for the spread. Spreads at lower levels do not have rates defined for them. The basic idea here is that each spread sets an upper bound on the number of spreads which can be formed by spreads contained within it. In the typical case, there is only one level of recursion, with a top-level spread containing a set of child spreads, each of which does not have children. The top-level spread sets an overall upper bound on the number of spreads formable by its child spreads.

Creating Combined Pools of Inter-Clearing Organization Spreads and of Cross-Margining Spreads Except for spreads in the crossmargining group and the inter-clearing organization group, spreads in each group are evaluated exchange complex by exchange complex, and it does not matter in which order the exchange complexes are processed. For the cross-margining group and the inter-clearing organization group, however, processing is not done by exchange complex. Instead, single pools of spreads are created which include all spreads provided for any exchange complex represented in the portfolio.

Duplicate spreads may be recognized. For example, the algorithm must recognize that these are the same spread. Each clearing organization can only provide a credit for its own products. In this example, when clearing organization X specifies the spread, the credit rate(s) it specifies only apply to its own products. And similarly for clearing organization Y. If clearing organization X recognizes the spread while organization Y does not, then the credit rate specified by X will apply only to X's products. Y's products will have a credit rate of zero. If both organizations recognize the spread, there nevertheless is no guarantee that they will have the same credit rates. X may specify one rate applicable to its products, and Y may specify a different rate applicable to its products.

Also, spreads may be prioritized by greatest total savings. The spreads in the combined pool must be prioritized according to greatest total savings across all legs.

Evaluating spreads group by group: For each exchange complex in the portfolio and for the spreads in the super-intercommodity spread group, evaluate each spread within the group in turn, in order by spread priority.

For each exchange complex in the portfolio and for the spreads in the intracommodity spread group, evaluate each spread within the group in turn, in order by spread priority. Finalize the spot charges for all delta periods to which they apply.

For each exchange complex in the portfolio and for the spreads in the pre-cross-margining spread group, evaluate each spread within the group in turn, in order by spread priority.

For the combined pool of crossmargining spreads, evaluate each spread in the pool, ordered as described above in descending order by total savings.

For each exchange complex in the portfolio and for the spreads in the intercommodity spread group, evaluate each spread within the group in turn, in order by spread priority.

For the combined pool of inter-clearing organization spreads, evaluate each spread in the pool, ordered as described above in descending order by total savings.

Evaluating a delta-based spread—Overview: The overall process for evaluating a delta-based spread that has no child spreads includes first, checking to make sure that each of the spread legs is present in the portfolio and then attempting to form spreads under each of the two possible assumptions of market side. In other words, first attempt to form spreads assuming that the "A" legs are long and the "B" legs are short. Then reverse the assumption and attempt to form spreads assuming that the "A" legs are short and the "B" legs are long. Under either assumption, if any spreads can be formed, determine for each leg the delta consumed by the spread. Remove the consumed delta from the remaining delta for that spread leg. Then re-evaluate delta values as needed so that remaining period deltas, intracommodity spread tier deltas, and intercommodity spread tier deltas are kept synchronized. Lastly, the charge or credit associated with the spreads formed is determined.

Determining the delta consumed for a particular leg of a delta-based spread under a particular assumption of market side:
1) Take the number of spreads formed.
2) Multiply by the delta per spread ratio for the leg.
3) If the current assumption is that the A side is long and this is a B leg, OR if the current assumption is that the A side is short and this is an leg, then multiply the above result by −1 to make it negative. (In other words, in this case, short delta has been consumed.)

Removing the delta consumed for a particular leg of a delta-based spread under a particular assumption of market side:
1) Initialize the remaining delta to be removed, as the delta to be consumed.
2) If the leg references a spread tier—either an intracommodity or an intercommodity spread tier, and either a specific tier or the overall tier:
   a) Beginning with the first delta period within the tier and continuing with each subsequent delta period within the tier, remove delta from each such period sequentially until remaining delta to be removed is zero.
3) But if the leg references a specific delta period, then remove delta from that specific period.
4) For each intracommodity or intercommodity spread tier containing the period from which some delta was removed decrement remaining long or short delta by the amount of delta removed from the period.

Calculating the credit for a particular leg of a delta-based spread which uses the weighted price risk method, and incrementing the credit amount for the appropriate tier: This would be for a delta-based spread that uses the weighted price risk method. Each leg of such a spread would reference either an intercommodity spread tier or a delta period for a combined commodity. If the leg references a tier, it will be either the overall intercommodity spread tier or, if specific tiers are defined, a specific intercommodity spread tier.
1) Take the absolute value of the delta consumed by the spread for this leg.
2) Determine the tier to use for reading the weighted price risk:
   a) If the leg references an intercommodity spread tier, select that tier.
   b) If the leg references a delta period:
      i) If specific intercommodity spread tiers are defined, select the specific tier containing this period.
      ii) If no specific tiers are defined, select the overall intercommodity spread tier.
   c) Take the absolute value of the delta consumed by the spread for this leg and this requirement level.
   d) Multiply this result by the weighted price risk for the selected tier and this requirement level.
   e) Multiply this result by the credit rate for the spread for this leg and this requirement level.
   f) If the spread giving rise to this credit is in any spread group other than the cross-margin spread group or the inter-clearing organization spread group:
      i) Increment the intercommodity spread credit for the selected tier, by the credit for this leg for this spread.
   g) But if the spread giving rise to this credit is in either the cross-margin spread group or the inter-clearing organization spread group:
      i) Increment the inter-clearing organization spread credit for the selected tier, by the credit for this leg for this spread.

(As described above, if the credit rate were negative, this would yield a negative credit)

Calculating the charge for a delta-based spread which uses the flat-rate method: This could apply to a pre-crossmargining spread, a super-intercommodity spread, an intracommodity spread, or an intercommodity spread. Generally (1) Take the number of spreads formed; and (2) multiply by the charge rate for the spread for this requirement level.

Scanning-Based Spreads

Scanning-based spreads are inherently intercommodity spreads, and can only be present within the three spread groups which (a) include more than one combined commodity among the legs and (b) do not cross exchange complexes. These groups are: pre-cross-margin, super-intercommodity, and normal intercommodity spreads. A scanning-based spread is similar to a delta-based spread in that it contains a collection of legs. Each leg, however, references only a specific combined commodity. The relative market side indicator is not applicable to the legs of a scanning-based spread. The delta per spread ratio is applicable, but, as will be described below, its application is somewhat different for a scanning-based spread than for a delta-based spread.

One of the legs of a scanning-based spread is designated as the target leg, and there is an associated parameter of the target leg called the target leg required flag: (1) If the target leg required flag is true, then the combined commodity designated as the target leg must be present in the portfolio in order for the spread to be formed, and if it is not, the spread is skipped. (2) If the target leg required flag is false, then the combined commodity designated as the target leg need not be present in the portfolio in order for the spread to be formed.

Similarly, for each leg which is not the target (a "non-target leg"), there is a parameter called the leg-required flag. If any non-target leg which is specified as required is not present in the portfolio, then the spread is skipped. In other words, all required non-target legs must be present in the portfolio in order for the spread to be formed.

As with a delta-based spread, a scanning-based spread has one or more credit rates specified for it, for different account types and requirement levels for those account types. All legs for a scanning-based spread must have the same scan point definitions.

Evaluating a Scanning-Based Spread: Verify that all of the required legs are represented in the portfolio. Skip the spread if not.

For the target leg, aggregate from the target leg and each of the non-target legs, thereby yielding the new value for the target leg, each of the eight types of position value, converted as needed to the performance bond currency of the target leg.

For each directly calculated requirement level, For each scanning tier for the target leg, for the target leg and for each non-target leg: (1) Perform the Risk Array Scaling and Currency Conversion Algorithm: (a) Take the risk array for the tier. (b) For each value in the risk array: (i) If this value is negative (e.g., a gain), multiply it by the credit rate expressed as a decimal fraction. (ii) If this leg is not the target, and if the performance bond currency for this leg is different from the performance bond currency for the target leg, then convert the value to the performance bond currency of the target.

Take the sum all of these appropriately scaled and converted risk arrays. This yields the new risk array for the overall scanning tier for the target leg. Select the largest loss and determine the scan risk and active scenario, exactly as for any scanning tier.

For each non-target leg, set each value in the risk array for the tier to zero. Then repeat the process of selecting the largest loss and determining the scan risk, thereby setting these values to zero.

For each delta period for the target leg, for the corresponding delta period for each non-target leg that exists, (1) Divide the delta-per-spread ratio for the target leg by the delta-per-spread ratio for this non-target leg, yielding the aggregation ratio, (2) determine the remaining delta to be aggregated, (a) multiply the remaining delta for this delta period by the aggregation ratio. (3) Determine the original delta to be aggregated, (a) multiply the original delta for this delta period by the aggregation ratio.

Take the sum of the remaining delta to be aggregated values from the corresponding delta period for each non-target leg that exists, and add this result to the remaining delta for this delta period on the target leg, yielding the new value for remaining delta for the target leg.

Take the sum of the original delta to be aggregated values from the corresponding delta period for each non-target leg that exists, and add this result to the original delta for this delta period on the target leg, yielding the new value for original delta for the target leg.

Take the sum of the Delivery (Spot) Charge for Delta Consumed by Spreads from the corresponding delta period for each non-target leg that exists (converted as needed to the performance bond currency of the target leg), and add this result to the same value on the target leg, yielding the new value for Delivery (Spot) Charge for Delta Consumed by Spreads for this delta period for the target leg.

Take the sum of the Delivery (Spot) Charge for Delta Remaining in Outrights from the corresponding delta period for each non-target leg that exists (converted as needed to the performance bond currency of the target leg), and add this result to the same value on the target leg, yielding the new value for Delivery (Spot) Charge for Delta Remaining in Outrights for this delta period for the target leg.

Set to zero for the corresponding delta period for each non-target leg: (1) original delta and remaining delta; (2) Delivery charge for delta consumed by spreads, and delivery charge for delta remaining in outrights For each intercommodity spread tier for the target leg:
1) For the target leg and for each non-target leg:
   a) Perform the same Risk Array Scaling and Currency Conversion Algorithm as described above for the scanning tiers
2) Take the sum all of these appropriately scaled and converted risk arrays. This yields the new risk array for the intercommodity spread tier for the target leg.
3) Aggregate from the target leg and each non-target leg, thereby yielding the new value for the target leg, each of the following elements:
   a) Intercommodity spread credit (converted as needed to the performance bond currency of the target leg)
   b) Inter-clearing organization spread credit (converted as needed to the performance bond currency of the target leg)
4) Take the sum of the original delta for each delta period within this tier which is positive, yielding the new value for original long delta for the tier.
5) Take the sum of the remaining delta for each delta period within this tier which is positive, yielding the new value for remaining long delta for the tier.
6) Take the sum of the original delta for each delta period within this tier which is negative, yielding the new value for original short delta for the tier.
7) Take the sum of the remaining delta for each delta period within this tier which is negative, yielding the new value for remaining short delta for the tier.
8) Select the largest loss and determine the time risk, volatility risk, price risk and weighted price risk, exactly as for any intercommodity spreading tier.
9) For each intercommodity spread tier for each non-target leg:
   a) Set each value in the risk array for the tier to zero.
   b) Set the original delta and remaining delta values to zero.
   c) Set the intercommodity spread credit and inter-clearing organization spread credit to zero.
   d) Repeat the process of determining the largest loss, volatility risk, time risk, price risk and weighted price risk, thereby setting all of these values to zero.

For each intracommodity spread tier for the target leg:
1) Take the sum of the original delta for each delta period within this tier which is positive, yielding the new value for original long delta for the tier.
2) Take the sum of the remaining delta for each delta period within this tier which is positive, yielding the new value for remaining long delta for the tier.
3) Take the sum of the original delta for each delta period within this tier which is negative, yielding the new value for original short delta for the tier.
4) Take the sum of the remaining delta for each delta period within this tier which is negative, yielding the new value for remaining short delta for the tier.

5) For each intracommodity spread tier for each non-target leg:
   a) Set the original delta and remaining delta values to zero.
   For each short option minimum tier for the target leg:
1) Aggregate from the target leg and the equivalent tier on each non-target leg, thereby yielding the new for the target leg, each of the following elements:
   a) Number of short puts
   b) Number of short calls
   c) Short option minimum charge (converted as needed to the performance bond currency for the target leg)
2) For each non-target leg:
   a) Set the number of short puts, the number of short calls, and the short option minimum charge, to zero.
   For the target leg combined commodity for this requirement level:
1) Aggregate from the target leg and each non-target leg, thereby yielding the new value for the target leg:
   a) Intracommodity spread charge (converted as needed to the performance bond currency of the target leg)

Hybrid Delta-Based/Scanning-Based Spreads

A hybrid delta-based/scanning-based intercommodity spread combines elements of delta-based spreading and scanning-based spreading. Hybrid spreads may be present only in the normal intercommodity spread group, or the pre-cross-margining spread group. Like a regular delta-based spread, the delta-based spread part of the hybrid spread definition will contain a collection of delta-based spread legs. There are several restrictions, however, on the specification of the spread and of its spread legs: (1) The spread is not recursive, e.g., it may not contain a subsidiary collection of delta-based spreads. (2) Each spread leg may reference only the overall intercommodity spread tier of a specific combined commodity. References to specific intercommodity spread tiers or to delta periods are not allowed. (3) All of the combined commodities referenced as legs of the delta-based spread must have the same performance bond currency. (4) A charge rate must be specified for the delta-based spread, which rate is denominated in that same performance bond currency.

Like a scanning-based spread, a hybrid spread will also specify a target leg, which will reference a specific combined commodity. This target combined commodity is never one into which any products are linked. It is not referenced by any spread until the hybrid spread for which it is specified as the target. After this spread, it may subsequently participate in intercommodity spreading, but only as a leg of a regular delta-based spread.

The following includes an algorithm for evaluating a hybrid spread, for each directly-calculated requirement level:
1) Perform the Algorithm for evaluating a top-level delta-based spread as described above, with one exception as specified herein:
   a) This has the effect of determining under each assumption of relative market-side, the number of delta-based spreads formable, of calculating the associated charge, and of decreasing series and tier deltas for each leg according to the delta consumed by the spread.
   b) The exception is that the charge calculated under each assumption of relative market-side is not apportioned back to the legs of the spread. Instead, the charges calculated under each assumption are summed to yield the basis risk.
2) Take the sum of the scan risk values for each of the overall intercommodity spread tiers in the non-target legs participating in the spread, yielding the total scan risk.
3) Now perform the Algorithm for evaluating a scanning-based spread as described above, using a 100% credit rate, but with the following exceptions:
   a) For each non-target leg, for the overall scanning tier, for any specific scanning tiers, for the overall intercommodity spreading tier, and for any specific intercommodity spreading tiers, do not set each value in the risk array for the tier to zero, and do not then re-evaluate for the tier the scan risk and (for the intercommodity spread tiers) the time risk, volatility risk, price risk and weighted price risk.
   b) Similarly, do not aggregate from the non-target legs to the target leg, and then set to zero on the non-target legs: the intracommodity spread charge
      i) for the overall intercommodity spread tier and for any specific intercommodity spread tiers, the intercommodity spread credit and the inter-clearing organization spread credit
      ii) for each delta period, the charge for delta consumed by spreads and the charge for delta remaining in outrights
      iii) for the overall short option minimum rate tier and for any specific short option minimum rate tiers, the short option minimum charge, and the number of short puts and the number of short calls
4) For the target leg, after determining the weighted price risk:
   a) Save the value for the scan risk on the target leg as the scan together risk.
   b) For the overall intercommodity spread tier, the overall scan tier, and any specific intercommodity spread tiers and specific scanning tiers:
      i) set the scan risk value to zero
      ii) for the intercommodity spread tiers, set the time risk, volatility risk, and price risk to zero, leaving only the value for weighted price risk.
5) The net result of this processing is that:
   a) Remaining deltas have been aggregated for intracommodity spread tiers, intercommodity spread tiers, and delta periods, from the non-target legs to the target.
   b) Weighted price risk has been determined for the overall intercommodity spread tier on the target.
   c) All other elements of the SPAN risk calculation remain with the non-target legs: the scan risk, intracommodity spread charge, short option minimum, spot charge, intercommodity spread credit, and inter-clearing organization spread credit.
   d) The value that would have been the scan risk for the target leg in a normal scanning-based spread has been saved as the scan together risk.
6) Take the sum of basis risk and scan together risk. Subtract this sum from the total scan risk. Divide this result by total scan risk. Take the larger of this result, and zero, thereby yielding the savings percentage.
7) For the overall intercommodity spread tier for each non-target leg:
   a) Take the largest loss for the tier.
   b) Multiply by the savings percentage, yielding the credit for this leg for the spread.
   c) Round this result to the normal precision for values denominated in this currency.
   d) Increment the intercommodity spread credit for the tier, by this amount.
   e) Again take the largest loss for the tier. Divide this value by the scan together risk. Save this result as the scan risk percentage for subsequent use.

Execution now proceeds to the next spread definition in the spread group, and to the remaining spread groups to be evaluated. As it does, the overall intercommodity spread tier of the combined commodity, which was the target of the original hybrid spread, may participate as a leg of other delta-based intercommodity spreads using the weighted price risk method of determining the credit.

If this occurs, the intercommodity spread credit for the original target leg calculated as a result of that delta-based spread, is apportioned back to the original non-target legs of the original hybrid spread, in proportion to the scan risk for that leg to the total scan risk. Here's how:

For each directly-calculated requirement level for the original hybrid spread target leg: (1) take the intercommodity spread credit value just calculated. (2) For each original non-target leg for the original hybrid spread: (a) Multiply the above value by the scan risk percentage for that non-target leg. (b) Round this result to the normal precision for the performance bond currency for that non-target leg. (c) Increment the intercommodity spread credit (or the inter-clearing organization spread credit if the spread now being processed is within the inter-clearing organization spread group or the cross-margin spread group) by this result. (d) Set the intercommodity spread value for the original hybrid spread target leg back to zero.

Finalizing the Spot Charge

This calculation will be performed for each combined commodity, after all spreads in the intracommodity spread group have been evaluated, but before any of the subsequent spread groups have been processed.

For each combined commodity in the portfolio and for each directly calculated requirement level for this combined commodity:
1) For each delta period for this combined commodity to which spot charges apply:
   a) If for this delta period it has been specified that spot charges apply to either long or short delta, OR if it has been specified that they apply to long delta only and the remaining delta for the period is positive, OR if it has been specified that they apply to short delta only and the remaining delta for the period is negative:
      i) Subtract the remaining delta for this period and requirement level from the original value for delta for the period and this requirement level. Take the absolute value of this amount. This yields the delta consumed by spreads.
      ii) Take the absolute value of the remaining delta for this period. This yields the delta remaining in outrights.
      iii) Multiply the delta consumed by spreads, by the charge rate for delta consumed by spreads, yielding the spot charge for delta consumed by spreads for this period and requirement level.
      iv) Multiply the delta remaining in outrights, by the charge rate for delta remaining in outrights, yielding the spot charge for delta remaining in outrights for this period and requirement level.
   b) Otherwise, the values for these two charges are zero.
2) Sum the spot charge for delta consumed by spreads for each period, yielding the total spot charge for delta consumed by spreads for this combined commodity for this requirement level.
3) Sum the spot charge for delta remaining in outrights for each period, yielding the total spot charge for delta remaining in outrights for this combined commodity for this requirement level.
4) Sum the spot charge for delta consumed by spreads, and the spot charge for delta remaining in outrights, yielding the total spot charge for the combined commodity and this requirement level.

Finalizing the Intercommodity Spread Credit and the Interexchange Spread Credit For each combined commodity in the portfolio:

For each directly calculated requirement level for the combined commodity: (1) take the sum of the intercommodity spread credit for the overall intercommodity spread tier, and the intercommodity spread credits for each specific intercommodity spread tier, if any. This yields the total intercommodity spread credit for the combined commodity. (2) Take the sum of the inter-clearing organization spread credit for the overall intercommodity spread tier, and the inter-clearing organization spread credits for each specific intercommodity spread tier, if any. This yields the total inter-clearing organization spread credit for the combined commodity.

Finalizing the Span Requirement(S) for Directly Calculated Requirement Levels:

For each combined commodity in the portfolio, and for each directly calculated requirement level for the combined commodity:
1) Take the sum of the scan risk, the intracommodity charge, and the spot charge. (This value is sometimes called the commodity risk.)
2) Subtract from this value, the sum of the intercommodity spread credit and the inter-clearing organization spread credit. (This value is sometimes called the prototype SPAN risk, or the pre-SPAN risk.)
3) Take the larger of this value and the short option minimum.
4) If a risk adjustment factor is defined for this directly calculated requirement level, multiply the above result by this risk adjustment factor.
5) If the positions in this combined commodity consist solely of long positions in option products, all of which options have non-zero values for their prices, then take the smaller of this result and the current value of those options in the performance bond currency.
6) The result is the SPAN risk requirement for this requirement level.

The third to last step is called capping the risk at long option value for portfolios consisting solely of long options. Note that the value at which the risk is capped may include both futures-style options and premium-style options. The key factor here is not how the options are valued, but whether they are long positions in products for which the current value of the risk is limited to the current value of the positions themselves.

Determining Derived Span Risk Requirements:

For each combined commodity represented in the portfolio, for each directly calculated requirement level for this combined commodity, and for each risk adjustment factor applicable to that requirement level or to any requirement level derived from that requirement level, process each such risk adjustment factor in turn: (1) take the SPAN risk requirement for the base requirement level. (2) Multiply by the risk adjustment factor, which converts a requirement from the specified base requirement level to the specified derived requirement level. (3) If the positions in this combined commodity consist solely of long positions in option products, all of which options have non-zero values for their prices, then take the smaller of this result and the current value of those options in the performance bond currency. (4) The result is the SPAN risk requirement for the derived requirement level.

Typically risk adjustment factors used to determine derived requirements, are used to determine an initial requirement level from a maintenance requirement level.

Determining the Available Net Option Value

For each combined commodity in the portfolio, determine the total net value in the performance bond currency of all positions in the portfolio for this combined commodity which are valued premium-style, as follows:
1) Take the following four values denominated in the performance bond currency:
   a) value of long option positions in products valued premium-style
   b) value of short option positions in products valued premium-style
   c) value of long non-option positions in products valued premium-style
   d) value of short non-option positions in products valued premium-style
2) If there are any portion of these position values for which full credit is not being given due the premium not yet having been paid or collected, adjust these values accordingly to remove that portion.
3) Subtract the adjusted value of short option positions valued premium-style from the adjusted value of long option positions valued premium-style, yielding the net value of option positions valued premium-style.
4) Subtract the adjusted value of short non-option positions valued premium-style from the adjusted value of long non-option positions valued premium-style, yielding the net value of non-option positions valued premium-style.
5) Take the sum of these two net values, yielding the net adjusted value of positions valued premium-style.

For each requirement level for this combined commodity (whether directly calculated or derived): (1) If for this combined commodity capping off available net option value at the risk has been enabled, then take the smaller of the net adjusted value of positions valued premium-style, and the SPAN risk requirement, yielding the available net option value for this requirement level. (2) But if such capping has not been enabled, the available net option value for this requirement level is equal to the net adjusted value of positions valued premium-style.

The SPAN calculation for omnibus accounts and other gross-margined firm-level accounts: As described above in the introductory section, Portfolios to be margined, an omnibus account is:
  a firm-level account type
  for which total positions are maintained on a gross basis—e.g., they may be simultaneously long and short
  for which subaccounts may be defined
  for which the portion of the total long and total short positions which are not contained in said defined subaccounts, are considered to be the naked long and naked short positions
  for which the naked long and naked short positions are margined on a gross basis—in other words, treated as if each such naked long position and each such naked short position is in a portfolio by itself, without any risk reductions due to offsetting positions.

Generically, a gross-margined firm-level account is any such account for which naked long and naked short positions are margined in this manner. An omnibus account may be considered to be an example of such an account for which there may also be positions in defined subaccounts.

This section describes the overall process for determining the SPAN risk requirements and the Available Net Option Values for the combined commodities represented in the portfolio for gross-margined firm-level accounts. This process includes: 1) Determining the naked long and naked short positions, 2) Calculating SPAN requirements for the subaccounts, if any; 3) Calculating SPAN requirements for the naked positions; and 4) Aggregating SPAN requirements for the subaccounts with the SPAN requirements for the naked positions, in order to determine the total SPAN requirement values for the combined commodity.

Determining the Naked Positions

For each position in the omnibus account: (1) Take the sum of all subaccount positions in this product that are net long. (2) Subtract this result from the Total Long position quantity for the omnibus account, yielding the Naked Long position. (3) Take the absolute value of the sum of all subaccount positions in this product that are net short. (4) Subtract this result from the Total Short position quantity for the omnibus account, yielding the Naked Short position.

Note that for each product represented in the omnibus account portfolio, the Total Long position must be at least as great as the sum of the subaccount positions that are net long, and the Total Short position must be at least as great as the absolute value of the sum of the subaccount positions that are net short. Naked position quantities may be zero, but by definition they may never be negative.

Calculating SPAN requirements for subaccounts: Whenever the SPAN calculation is to be performed for an omnibus account, after determining the naked positions, the normal SPAN calculation for net portfolios should be performed for each subaccount of that omnibus account, if any are defined.

For each such subaccount, for each combined commodity represented in the portfolio for the subaccount, the result will be the SPAN risk requirement and Available Net Option Value for each directly-calculated and indirectly-calculated requirement level for that combined commodity. Evaluating the SPAN requirements for the subaccounts first simplifies the SPAN calculation for the omnibus account, in that it ensures that the subaccount requirements will be available for aggregation to the omnibus account when they are needed.

Calculating SPAN requirements for naked positions: For each combined commodity in the portfolio, for each position for this combined commodity, and for the naked long position quantity, perform the Naked Position SPAN evaluation algorithm to determine for each directly and indirectly calculated requirement level for this combined commodity:
1) the SPAN risk requirement
2) the Available Net Option Value
3) For the naked short position quantity, perform the Naked Position SPAN evaluation algorithm to determine for each directly and indirectly calculated requirement level for this combined commodity:
   a) the SPAN risk requirement
   b) the Available Net Option Value
4) For each directly and indirectly calculated requirement level for this combined commodity:
   a) Sum the SPAN requirement for naked longs for this requirement level, and the SPAN requirement for naked shorts for this requirement level, yielding the total SPAN requirement for nakeds for this position and this requirement level.
   b) Sum the Available Net Option Value for naked longs for this requirement level, and the Available Net Option Value for naked shorts for this requirement level, yielding the total Available Net Option Value for nakeds for this position and this requirement level.
5) For each directly and indirectly calculated requirement level:
   a) Take the sum of the SPAN requirement for nakeds, across all positions for the combined commodity, yielding the SPAN requirement for naked positions for the combined commodity for this requirement level.
   b) Take the sum of the Available Net Option Value for nakeds, across all positions for the combined commodity, yielding the Available Net Option Value for naked positions for the combined commodity for this requirement level.

Naked Position Span Evaluation Algorithm

This algorithm is described to either the naked long quantity or the naked short quantity of a position held in a gross-margined account, either at the firm-level or the clearing-level.

1) Create a net portfolio for the purpose of this calculation, consisting solely of this naked long (or naked short) position.
2) Apply the SPAN algorithm to this net portfolio.
3) For each requirement level directly calculated:
4) Determine the SPAN requirement and the Available Net Option Value for this requirement level and for the combined commodity containing the net position.
5) If split allocation or margining-positions-as-equivalents caused other combined commodities to be represented in the portfolio:
6) For each such other combined commodity, determine the value of the SPAN requirement and the Available Net Option Value for that other combined commodity, in the performance bond currency of the original combined commodity containing the position:
   a) If the performance bond currency of this other combined commodity is the same as the performance bond currency of the combined commodity containing the positions, simply take the SPAN requirement and the Available Net Option Value for that other combined commodity.
7) But if these two currencies are not the same:
   a) Multiply the SPAN requirement for the other combined commodity by the appropriate rate to convert it to the performance bond currency of the original combined commodity, and round this result to the normal precision for that original performance bond currency.
   b) Multiply the Available Net Option Value for the other combined commodity by the same rate, and round this result to the normal precision for that original performance bond currency.
8) Take the sum of these equivalent values for SPAN requirement, across all such other combined commodities.
9) Increment the SPAN requirement for the original combined commodity containing the net position, by this sum.
10) Take the sum of the equivalent values for Available Net Option Value, across all such other combined commodities.
11) Increment the SPAN requirement for the original combined commodity containing the net position, by this sum.
12) The result so far is the SPAN requirement and the Available Net Option Value for the naked long (or naked short) position for this directly calculated requirement level.
13) If any requirement levels are derived from this directly calculated requirement level, apply the risk adjustment factor(s) in turn to determine the derived SPAN risk requirement and Available Net Option Value for the naked long (or naked short) position for each such derived requirement.

Aggregating SPAN requirements for Naked Positions with SPAN requirements for subaccounts: For each combined commodity represented in the omnibus account portfolio, for each requirement level for which requirements have been determined for this portfolio, whether directly or indirectly calculated:

1) Take the sum of the SPAN risk requirements for this requirement level across all subaccount portfolios in which this combined commodity is represented. This yields the total SPAN risk requirement for subaccounts for this requirement level.
2) Similarly, take the sum of the Available Net Option Values for this requirement level across all subaccount portfolios in which this combined commodity is represented. This yields the total Available Net Option Value for subaccounts for this requirement level.
3) Take the sum of the total SPAN risk requirement for subaccounts, and the total SPAN risk requirements for naked positions, yielding the overall SPAN risk requirement for the combined commodity and this requirement level.
4) Similarly, take the sum of the total Available Net Option Value for subaccounts, and the total Available Net Option Value for naked positions, yielding the overall Available Net Option Value for the combined commodity and this requirement level.

The Span Calculation for Gross-Margined Clearing-Level Accounts

When a clearing-level account is gross-margined, positions are first maintained on a gross basis. For any particular position in the portfolio, a Total Long position and a Total Short position are defined. Second, of the Total Long and Total Short position quantities, some portion is specified to be intercommodity spreadable and some portion is said to be intracommodity spreadable. Positions that are neither inter nor intracommodity spreadable are naked. So for each position in a gross-margined clearing-level portfolio, six position quantity values will be specified:

Total Long
Total Short
Intracommodity Spreadable Long
Intracommodity Spreadable Short
Intercommodity Spreadable Long
Intercommodity Spreadable Short
Naked Long
Naked Short Note that the same convention as with gross-margined firm-level accounts is followed, where both long and short position quantities are expressed as positive numbers. At the CME, when clearing member firms report their positions for a processing cycle, they specify for each position the total long and short quantities, the intracommodity spreadable long and short quantities, and the intercommodity spreadable long and short quantities.

The naked long quantity is then determined by subtracting the intracommodity spreadable long quantity and the intercommodity spreadable long quantity from the total long quantity, and analogously for the naked short quantity. By definition, the total long quantity must always be the sum of the intracommodity spreadable long, the intercommodity spreadable long, and the naked long. The total short must always be the sum of the intracommodity spreadable short, the intercommodity spreadable short, and the naked short.

Overall SPAN process for gross-margined clearing-level portfolios: For each position in the portfolio:

1) Determine the intracommodity spreadable net position quantity by subtracting the intracommodity spreadable short quantity from the intracommodity spreadable long quantity.
2) Determine the intercommodity spreadable net position quantity by subtracting the intercommodity spreadable short quantity from the intercommodity spreadable long quantity.
3) Process the portfolio of intercommodity spreadable net positions through the SPAN algorithm as described above for net portfolios. This yields, for each combined commodity in the portfolio, for each directly and indirectly-calculated requirement level for that combined commodity, the SPAN requirement and the Available Net Option Value for the intercommodity spreadable positions.
4) Process the portfolio of intracommodity spreadable net positions through SPAN algorithm as described above for net portfolios, but omit processing of all of the spread groups except the intracommodity spread group. The result is, for each combined commodity in the portfolio, for each directly and indirectly-calculated requirement level for that combined commodity, the SPAN requirement and the Available Net Option Value for the intracommodity spreadable positions.
5) Process each naked long and naked short position through the SPAN algorithm for naked positions, and aggregate the resulting naked risk requirements and available net option values to the combined commodity level, exactly as described above for omnibus accounts. The result is, for each combined commodity in the portfolio, for each directly and indirectly calculated requirement level for that combined commodity, the SPAN requirement and the Available Net Option Value for naked positions.

For each combined commodity in the portfolio:
1) For each directly and indirectly calculated requirement level for the combined commodity:
2) Take the sum of the SPAN risk requirement for intercommodity spreadable positions, the SPAN risk requirement for intracommodity spreadable positions, and the SPAN risk requirement for naked positions. The result is the total SPAN risk requirement for the combined commodity for this requirement level.
3) Take the sum of the Available Net Option Value for intercommodity spreadable positions, the Available Net Option Value for intracommodity spreadable positions, and the Available Net Option Value for naked positions. The result is the total Available Net Option Value for the combined commodity for this requirement level.

Aggregation of Values From combined Commodities:
Determining values to use for aggregation for each combined commodity:
1) Determine the highest performance bond class for which requirement have been calculated among all combined commodities represented within the portfolio.
2) For each combined commodity in the portfolio:
   a) For each such performance bond class for which requirements have been calculated, beginning with the core class and ascending in priority order to the highest class represented in the portfolio:
      i) If requirements were calculated for this class:
         (1) Use the calculated values for the following four values, as the values to use for aggregation:
            (a) SPAN requirement—maintenance—specified class
            (b) SPAN requirement—initial—specified class
            (c) Available Net Option Value—maintenance—specified class
            (d) Available Net Option Value—initial—specified class
            (e) But if requirements were not calculated for this class for this combined commodity:
            (f) Use the above four values for aggregation for the immediately preceding class, as the values for aggregation for this class.

Aggregation of currency-level requirements from combined commodities to report groups, exchange complexes, and the overall portfolio level:

1) For each exchange complex represented in the portfolio:
   a) For each combined commodity report group for this exchange complex:
      i) Determine the set of performance bond currencies represented among the combined commodities for this report group within this exchange complex.
      ii) For each such performance bond currency represented within the group:
      iii) For each performance bond class for which requirements have been calculated within the portfolio:
         (1) Take the sum of the values for aggregation, for this class, for any combined commodity within the group with this performance bond currency, of the following:
            (a) SPAN requirement—maintenance—specified class
            (b) SPAN requirement—initial—specified class
            (c) Available Net Option Value—maintenance—specified class
            (d) Available Net Option Value—initial—specified class
      iv) The result is the specified value, for the specified class, for the specified performance bond currency, for the specified report group with the specified exchange complex.

For each exchange complex represented in the portfolio:
1) Determine the set of performance bond currencies represented among the combined commodities within this exchange complex.
2) For each such performance bond currency represented within the exchange complex:
3) For each performance bond class for which requirements have been calculated within the portfolio:
   a) Take the sum of the values for aggregation, for this class, for any combined commodity within the exchange complex with this performance bond currency, of the following:
      (1) SPAN requirement—maintenance—specified class
      (2) SPAN requirement—initial—specified class
      (3) Available Net Option Value—maintenance—specified class
      (4) Available Net Option Value—initial—specified class
   ii) The result is the specified value, for the specified class, for the specified performance bond currency, for the specified exchange complex.

For the total portfolio:
1) Determine the set of performance bond currencies represented among the combined commodities within the total portfolio.
2) For each such performance bond currency represented:
   a) For each performance bond class for which requirements have been calculated within the portfolio:
      i) Take the sum of the values for aggregation, for this class, for any combined commodity within the portfolio, of the following:
         (1) SPAN requirement—maintenance—specified class
         (2) SPAN requirement—initial—specified class
         (3) Available Net Option Value—maintenance—specified class
         (4) Available Net Option Value—initial—specified class
      ii) The result is the specified value, for the specified class, for the specified performance bond currency, for the total portfolio.

Determining Portfolio-Currency Equivalent Requirement Values

For each exchange complex within the portfolio, for each report group within that exchange complex, For each performance bond class for which requirements have been calculated within the portfolio, and for each performance bond currency represented within that report group:
1) Determine the portfolio-currency equivalents as specified below, of the following four values:
   a) SPAN requirement—maintenance—specified class
   b) SPAN requirement—initial—specified class
   c) Available Net Option Value—maintenance—specified class
   d) Available Net Option Value—initial—specified class
   e) If the portfolio currency is equal to this performance bond currency, then the portfolio currency value is the specified value.
   f) But if the portfolio currency is different from this performance bond currency, determine the portfolio currency equivalent value:
      i) Multiply the value in the performance bond currency by the appropriate conversion rate. Then round to the normal precision for this portfolio currency.
2) Take the sum of the porffolio-currency equivalent value for the maintenance SPAN requirement for this class for the different performance bond currencies, yielding the total portfolio-currency equivalent value for the maintenance SPAN requirement for this class and this report group.
3) Take the sum of the porffolio-currency equivalent value for the initial SPAN requirement for this class for the different performance bond currencies, yielding the total portfolio-currency equivalent value for the initial SPAN requirement for this class and this report group.
4) Take the sum of the porffolio-currency equivalent value for the maintenance Available Net Option Value for this class for the different performance bond currencies, yielding the total portfolio-currency equivalent value for the maintenance Available Net Option Value for this class and this report group.
5) Take the sum of the porffolio-currency equivalent value for the initial Available Net Option Value for this class for the different performance bond currencies, yielding the total portfolio-currency equivalent value for the initial Available Net Option Value for this class and this report group.

For each exchange complex within the portfolio, for each performance bond class for which requirements have been calculated for this exchange complex within the portfolio, and for each performance bond currency represented within that exchange complex:
1) Determine the portfolio-currency equivalents as specified below, of the following four values, exactly as this was done above:
   a) SPAN requirement—maintenance—specified class
   b) SPAN requirement—initial—specified class
   c) Available Net Option Value—maintenance—specified class
   d) Available Net Option Value—initial—specified class
2) Take the sum of the porffolio-currency equivalent value for the maintenance SPAN requirement for this class for the different performance bond currencies, yielding the total portfolio-currency equivalent value for the maintenance SPAN requirement for this class and this exchange complex.
3) Take the sum of the porffolio-currency equivalent value for the initial SPAN requirement for this class for the different performance bond currencies, yielding the total portfolio-currency equivalent value for the initial SPAN requirement for this class and this exchange complex.
4) Take the sum of the porffolio-currency equivalent value for the maintenance Available Net Option Value for this class for the different performance bond currencies, yielding the total portfolio-currency equivalent value for the maintenance Available Net Option Value for this class and this exchange complex.
5) Take the sum of the porffolio-currency equivalent value for the initial Available Net Option Value for this class for the different performance bond currencies, yielding the total portfolio-currency equivalent value for the initial Available Net Option Value for this class and this exchange complex.

For the total portfolio, for each performance bond class for which requirements have been calculated within the portfolio, for each performance bond currency represented within the total portfolio:
1) Determine the portfolio-currency equivalents as specified below, of the following four values, exactly as this was done above:
   a) SPAN requirement—maintenance—specified class
   b) SPAN requirement—initial—specified class
   c) Available Net Option Value—maintenance—specified class
   d) Available Net Option Value—initial—specified class
2) Take the sum of the porffolio-currency equivalent value for the maintenance SPAN requirement for this class for the different performance bond currencies, yielding the total portfolio-currency equivalent value for the maintenance SPAN requirement for this class and the total portfolio.
3) Take the sum of the porffolio-currency equivalent value for the initial SPAN requirement for this class for the different performance bond currencies, yielding the total portfolio-currency equivalent value for the initial SPAN requirement for this class and the total portfolio.
4) Take the sum of the porffolio-currency equivalent value for the maintenance Available Net Option Value for this class for the different performance bond currencies, yielding the total portfolio-currency equivalent value for the maintenance Available Net Option Value for this class and the total portfolio.
5) Take the sum of the porffolio-currency equivalent value for the initial Available Net Option Value for this class for the different performance bond currencies, yielding the total portfolio-currency equivalent value for the initial Available Net Option Value for this class and the total portfolio.

Comparison of collateral to requirements and determination of whether an excess or a deficiency exists: The SPAN algorithm determines the SPAN requirements and available net option value for the different requirement levels for each combined commodity within the portfolio, and aggregates of these values to the report group, exchange complex and total portfolio levels, both by performance bond currency represented and as equivalent values in the portfolio currency. The valuation of collateral deposited to meet requirements, the comparison of collateral to requirements and the determination of excess or deficit amounts is, strictly speaking, outside the scope of SPAN. At the clearing-level, and especially if requirements are calculated for more than one performance bond class and if various different types of collateral are accepted, this process can be complex. For ordinary customer accounts at the firm-level, where only one class of performance bond requirement is calculated, the process is typically much simpler, and is described herein:

1) Determine the overall value in the portfolio currency to be used for margining (the "performance bond" value) of non-cash collateral assets. This value is typically called the securities on deposit.
2) Determine the net value in the portfolio currency of cash in the account due to gains (or losses) on open positions in products valued futures-style. This value is typically called the open trade equity.
3) Determine the net value in the portfolio currency of all other cash in the account. This value is typically called the ledger balance.
4) Take the sum of the above three values, plus the available net option value for the maintenance requirement for the core performance bond class. This yields the funds available for margin for the core maintenance requirement.
5) Take the sum of the above three values, plus the available net option value for the initial requirement for the core class. This yields the funds available for margin for the core initial requirement.
6) Determine whether the portfolio is considered "new" or "existing":
    a) If the portfolio contained no positions whatever at the close of business for the preceding business day, then portfolio is considered to be a new one.
    b) Otherwise, the portfolio is considered to be a previously existing one.
7) If the portfolio is considered "existing" and If the funds available for margin for the maintenance requirement for the core class, is greater than or equal to the core maintenance SPAN requirement:
    a) Then the maintenance requirement is deemed to be applicable. The applicable SPAN risk requirement is the SPAN requirement for maintenance for the core class, and the applicable funds available for margin is equal to the funds available for margin for maintenance for the core class.
8) But if the portfolio is considered "new" or if it is considered existing, but the funds available for margin for the maintenance requirement for the core class is less than the SPAN requirement for maintenance for the core class:
    a) Then the initial requirement is deemed to be applicable. The applicable SPAN risk requirement is the SPAN requirement for initial for the core class, and the applicable funds available for margin is the funds available for margin for initial for the core class.
9) Subtract the applicable SPAN requirement from the applicable funds available for margin, yielding the excess (if this value is positive) or deficit (if this value is negative) amount.

Margin Offsets Across Portfolios

The SPAN process, method and system described herein has generally related to calculating or determining the margin requirements with respect to a single portfolio. However, it will be understood that the disclosure relating to the SPAN process, method and system as well as the margining requirements for a portfolio may be applied to multiple portfolios and more particularly to multiple portfolios backed or underwritten by a common capital pool. For example, the teaching and disclosure related to determining a margin for the individual contracts and positions within a single portfolio may be applied to determining an overall or cross-portfolio margin for multiple portfolios.

Maximizing Margin Credit for Delta Neutral Portfolios

While the SPAN process herein may determine the optimal margin requirement for a given portfolio, which includes determining any margin credits therefore, other factors may be of concern to the trader and which the trader may wish to balance against the optimal margin requirement or the credit they receive therefore. Optimal margin credit may be a credit towards a margin requirement for a given position that most closely approximates the maximum credit rate set by the exchange, clearing organization, or other entity, against the margin requirement for that position.

For example, many traders utilize a trading strategy known as "delta neutral trading" whereby the trader attempts to maintain the overall delta of their portfolio at a neutral level by holding various offsetting positions. Delta is the amount by which an option's price will change for a corresponding change in price by the underlying entity, e.g. the ratio of the change in price of a call option to the change in price of the underlying stock, also referred to as a hedge ratio. Call options have positive deltas, while put options have negative deltas. Technically, the delta is an instantaneous measure of the option's price change, so that the delta will be altered for even fractional changes by the underlying entity. For futures, Delta is the measure of the price-change relationship between an option and the underlying futures price and is equal to the change in premium divided by the change in futures price. A set of options is considered Delta Neutral when they comprise positive delta options and negative delta options that offset each other to produce a position which neither gains nor decreases in value as the underlying entity (the "underlier") moves slightly up or down. Such a position will return a profit no matter which way the underlying entity eventually moves as long as the move is significant. A delta hedge is a simple type of hedge that may be widely used by derivative traders to reduce or eliminate a portfolio's exposure to some underlier. The trader may calculate the portfolio's delta with respect to the underlier and then may add an offsetting position in the underlier, or another underlier, to make the portfolio's delta zero, i.e. Delta Neutral. The offsetting position may take various forms, but a spot, forward or futures position in the underlier is typical. All that is really required is that the position's delta substantially offset that of the original portfolio. Delta hedging refers to a dynamic hedging strategy using options that calls for constant adjustment of the number of options used, as a function of the delta of the option.

However, a portfolio that is delta neutral may not receive optimal margin credit due to the mechanisms by which margin credits are allocated for spread positions held therein. This is because implied margin requirements, i.e. margin requirements which are discounted to reflect the lower risk when offsetting positions are held in the same portfolio, are computed by offsetting the larger margin requirement of the two legs of the spread against only a fraction of the smaller margin requirement of the other leg. The fraction or discount is determined by the exchange, clearing organization, other risk management entity, or combination thereof. As the two legs will typically have unequal quantities to maintain the delta neutral position of the portfolio, they will have unequal margin requirements resulting in an implied credit that deviates from the target credit offered by the exchange or clearing organization. Ideally, the implied credit equals the target credit to balance the interests of both the trader and the exchange/clearing organization. However, from the trader's perspective the implied credit may meet or exceed the target credit while from the exchange or clearing organization's perspective, the implied credit may meet or be less than the target credit.

While a trader may create test portfolios and analyze them using SPAN to identify the optimal portfolio, such manual analysis would be time consuming and, given the dynamic nature of the market, deliver untimely results. The disclosed embodiments automatically determine positions to hold which result in a delta neutral portfolio while optimizing margin credits therefore. In particular, the present embodiments determine the optimal starting position, i.e. quantity of a given product, from which to then determine subsequent positions, i.e. quantities of other products, to remain delta neutral, while balancing this against the optimal margin credit (where the SPAN credit amount for each position in the portfolio most closely approximates the credit rate set by the clearing organization, across the entire portfolio). The disclosed embodiments may operate using current/real-time market data and, therefore, return timely results reflecting the current state of the market and allowing the trader to act accordingly. In one embodiment, parallel analysis may be utilized to evaluate multiple potential portfolios to identify the optimal portfolio, as will be discussed.

The disclosed embodiments utilize hedge ratios to determine the optimal hedge ratio and associated scanning spread. This tells traders what ratios of the quantities of products they should have in their portfolio in order to maintain the status of the portfolios as delta neutral, i.e. be delta hedged, and receive optimal margin credits therefore. As described above, a hedge ratio is the ratio, in one embodiment, of the value of futures contracts purchased or sold to the value of the cash commodity being hedged, a computation necessary to minimize basis risk. The Hedge Ratio may be defined as the number of futures contracts required to buy or sell so as to provide the maximum offset of risk and which may depend on value of a futures contract, the value of the portfolio to be hedged, and the sensitivity of the movement of the portfolio price to that of the Index (Called Beta). The hedge ratio is closely linked to the correlation between the asset (portfolio of shares) to be hedged and underlying (index) from which Future is derived. Effectively, the best scanning based credits and the positions needed to get that credit are determined. While the disclosed embodiments solve for the lowest error between the implied credit and a target credit for a given starting position and hedge ratios, as will be described, the disclosed embodiments may also be used to determine the target credit rate.

FIG. 1 shows an exemplary risk management system 100, according to one embodiment, for maximizing margin credits while maintaining a delta neutral status for a portfolio. It will be appreciated that the disclosed embodiments may be implemented in hardware, software or a combination thereof and that one or more components which are described individually may be combined into a single component having the described functionality or they may be further divided into sub-components thereof. Further, the described operations may be performed in parallel where one operation is not dependent upon the results of another operation, and such parallel processing is implementation dependent. In one embodiment, the disclosed system is integrated with a risk management system, such as a risk management system operated by an exchange, clearing organization or other entity. Alternatively, the disclosed embodiments may be offered as separate product or service by the exchange, clearing organization or other entity or third party. In one embodiment, the system 100 is provided as part of the SPAN® software published by the Chicago Mercantile Exchange Inc., located in Chicago, Ill., described above.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exemplary risk management system 100 includes a portfolio processor 102 which receives financial data 104, product specifications 108 and risk management data 106 and, based thereon, generates a specification of an optimal portfolio 110 as will be described. Product specification 108 include specifications of the products, such as treasury futures, etc. of which user is interested in determining the optimal portfolio for optimal margin credit while being delta hedged. The products included in the product specifications 108 may be selected by the trader, such as based on a present portfolio, or otherwise selected based on other criteria. In one embodiment, the products included in the product specification 108 may be automatically selected based on specified criteria such as market performance, risk or applicable margin credits for the given product. Financial data 104 may include real time or non-real time market data from a financial data source, such as Bloomberg, or other source or may be provided via internal calculations, an includes hedge ratios for each of the products of interest specified by the product specification 108 indicating, based on market data or otherwise, the ratios of the products to hold to be delta hedged. Risk management data 106 may be provided by an exchange, clearing organization or other entity and includes real time or non-real time margin data, such as outright margin requirements for the individual products of the product specification 108, and target credit rates for the spread therebetween. In one embodiment, based on the product specification 108, the disclosed embodiments automatically retrieve the financial data 104 and risk management data 106 based thereon.

Figure 2:
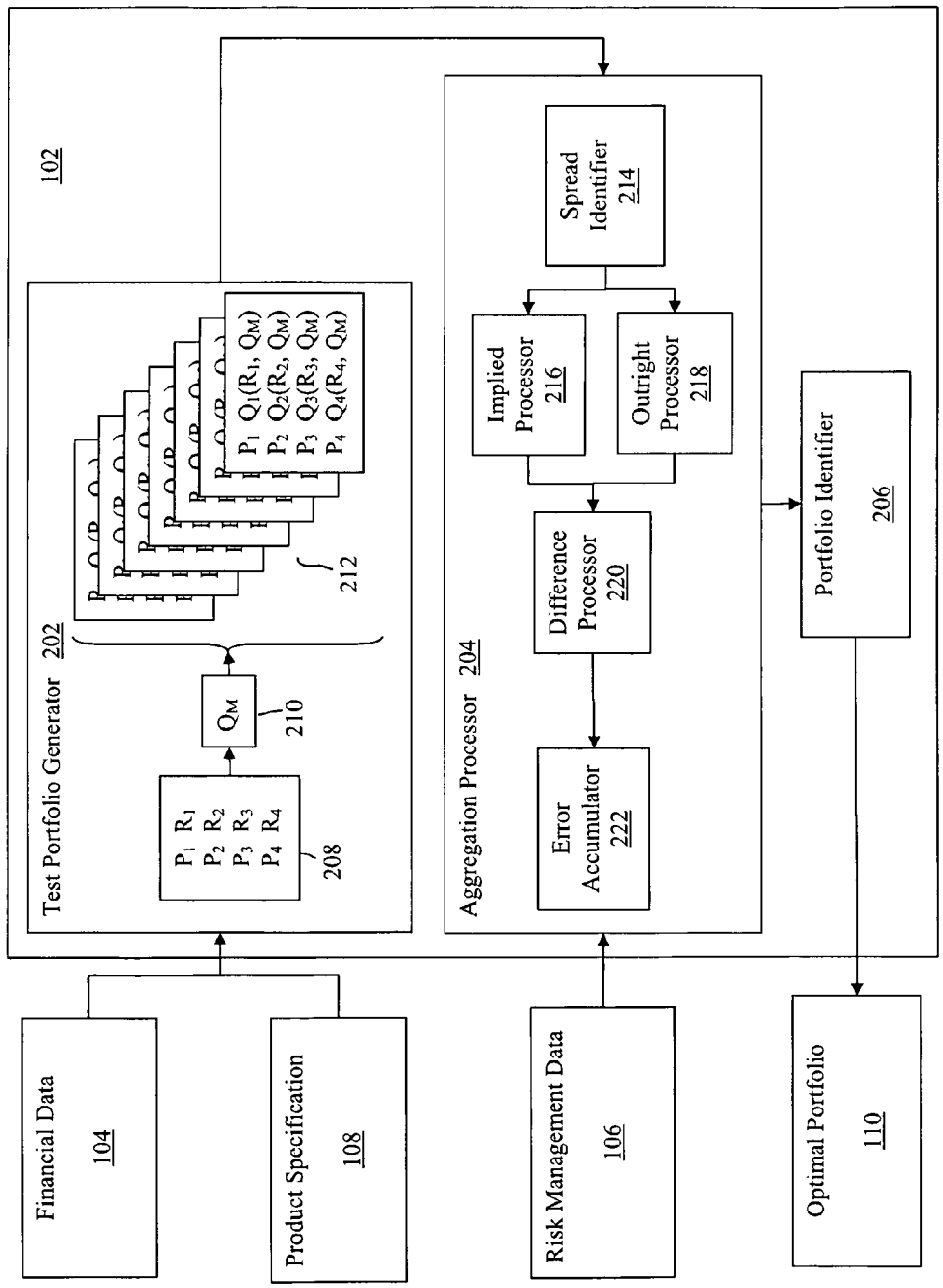
FIG. 2 depicts a more detailed block diagram of the exemplary system of FIG. 1.

FIG. 2 shows a more detailed block diagram of the system of FIG. 1 for identifying a portfolio having both a substantially neutral delta and optimal margin credit therefore. The portfolio processor is operative to evaluate a plurality of portfolios, each portfolio containing at least two products and differing from other portfolios of the plurality of portfolio based on the quantities of the at least two products contained therein, the quantities of each of the at least two products specified to achieve a delta substantially close to neutral for the portfolio, each portfolio being further characterized by at least one spread between the at least two products, each of the at least one spread being associated with an implied credit and a target credit. As shown in FIG. 2, the portfolio processor 102 includes a test portfolio generator 202, an aggregation processor 204 and a portfolio identifier 206.

The test portfolio generator 202 creates the test portfolios 212 which will be tested to determine the optimal portfolio 110. Based on the product specification 108 and financial data 104, the test portfolio generator 202 creates a base portfolio 208 including the products of interest, labeled $P_x$, and the hedge ratios therefore, labeled $R_x$. Using a multiplier 210, labeled $Q_M$, the test portfolio generator 202 generates one or more test portfolios 212 with varying quantities of the products of interest by varying the quantity of one or more of the products of interest based on the multiplier $Q_M$ and computing quantities of the remaining products based on the hedge ratios in relation thereto. The multiplier $Q_M$, as well as the starting and ending values, may be varied incrementally or non-incrementally in whole number increments or otherwise and the variation may be defined by the user, the exchange the clearing organization or other entity or combination thereof, or preset or automatically defined by the system 100. In one embodiment, the multiplier $Q_M$ is varied in whole number increments starting with 1 and incrementing by 1 to a maximum of 10. It will be appreciated that the various test portfolios 212 may be created and tested in parallel or serially.

For each test portfolio 212, the aggregation processor 204, which is coupled with the test portfolio generator 202, is operative to aggregate differences between the implied credits and the target credits for each spread therein. For each spread of each test portfolio, the aggregation processor 204 computes an implied margin requirement for the spread, an outright margin requirement for the spread, an implied credit rate based on the implied and outright margin requirements, and the difference between the implied credit and the target credit based on the implied credit rate and a target credit rate for the spread. As was described, the target credit rate is obtained from an exchange, clearing organization, or combination thereof. The aggregation processor 204 includes a spread identifier 214, an implied processor 216, an outright processor 218, a difference processor 220 and an error accumulator 222.

The spread identifier 214 identifies each unique spread between each of the products of the test portfolio 212, each product being a leg of the spread. A portfolio with four products may have six unique spread combinations therein. The implied processor 216 is coupled with the spread identifier 214 and computes an implied margin for each spread based on the outright margins of each leg and the target credit rate, provided with the risk management data 106, and the quantities determined by the test portfolio generator 202 for the test portfolio 212. The outright processor 218 is coupled with the spread identifier 214 and computes an outright margin for each spread based on the outright margins of each leg, provided with the risk management data 106, and the quantities determined by the test portfolio generator 202 for the test portfolio 212. It will be appreciated that the implied and outright margins for each spread may be computed serially or in parallel with each other and/or with the value for the other spreads within the test portfolio 212 and/or the other test portfolios 212.

The difference processor 220 is coupled with the implied 216 and outright 218 processors and computes an implied credit for each spread based on the difference between the implied and outright margins for the given spread. An error accumulator 222 is coupled with the difference processor 220 and computes an error value between implied credit for the spread and the target credit rate for the spread. The difference processor 220 further accumulates the error values for all of the spreads of the test portfolio 212. In one embodiment, the error between the implied credit and the target credit rate is computed as a squared difference, wherein the accumulated error for the test portfolio 212 is computed as a sum of the squared differences. It will be appreciated that other mathematical functions performing the same or similar function may be utilized.

It will be appreciated that more than one aggregation processor 204 may be provided so as to be able to process more than one test portfolio 212 at least substantially simultaneously.

The portfolio identifier 206 is coupled with the aggregation processor and receives the accumulated error values for each test portfolio 212. The portfolio identifier 206 is operative to identify an optimal portfolio 110 of the test portfolios 212 as the portfolio of the plurality of portfolios whose accumulated error value/aggregate difference indicates a greater number of the at least one spread with an implied credit closest to the target credit than other portfolios of the plurality of portfolios. In one embodiment, the optimal portfolio 110 is the test portfolio 212 identified to have the lowest accumulated error value of the test portfolios 212.

Figure 3:
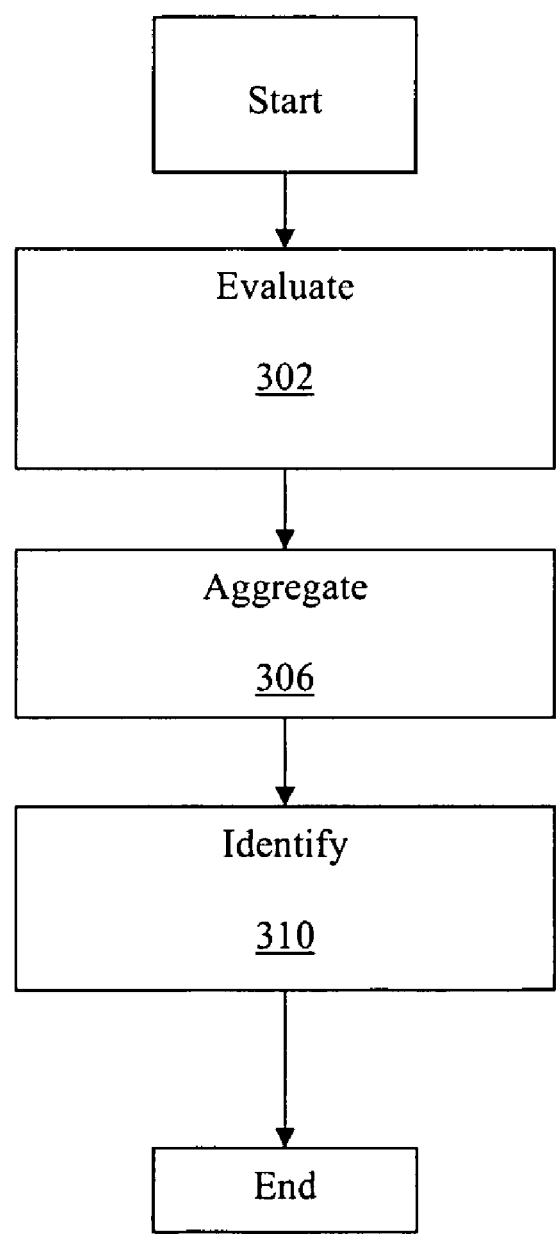
FIG. 3 depicts flow chart showing exemplary operation of the portfolio optimization system of FIG. 1.

FIG. 3 shows a flow chart depicting exemplary operation of the system 100 of FIG. 1. In operation, a plurality of portfolios are evaluated (block 302), each portfolio containing at least two products and differing from other portfolios of the plurality of portfolio based on the quantities of the at least two products contained therein, the quantities of each of the at least two products specified to achieve a delta substantially close to neutral for the portfolio, each portfolio being further characterized by at least one spread between the at least two products, each of the at least one spread being associated with an implied credit and a target credit. For each portfolio of the plurality of portfolios, differences between the implied credits and the target credits for each of the at least one spread are aggregated (block 306), such as by computing the difference between the implied credit and the target credit using a squared difference and summing the squared differences of each spread. An optimal portfolio is then identified as the portfolio of the plurality of portfolios whose aggregate difference indicates a greater number of the at least one spread with an implied credit closest to the target credit than other portfolios of the plurality of portfolios (block 310).

In one embodiment, for each of the at least one spread of each portfolio of the plurality of portfolios, an implied margin requirement for the spread is computed, an outright margin requirement for the spread is computed, an implied credit rate based on the implied and outright margin requirements is computed, and the difference between the implied credit and the target credit based on the implied credit rate and a target credit rate for the spread is computed. In one embodiment, the target credit rate is obtained from an exchange, clearing organization, or combination thereof.

In an alternate embodiment, quantities of each of a plurality of derivative products to include in a portfolio may be computed wherein each of the plurality of derivative products is characterized by a product position based on underlying product and a product delta representative of a sensitivity of the product position to change in price of the underlying product, the portfolio being characterized by a portfolio delta representative of a net sum of the product delta of each of the plurality products included in the portfolio. The quantities are computed so as to optimize credit towards a margin requirement for the portfolio while maintaining the portfolio delta of the portfolio substantially close to zero. In operation, for at least one product of the plurality of products, an exemplary set of first quantities of the at least one product are identified. For each first quantity of the at least one product of the set of first quantities: second quantities of each of the other of the plurality of products are computed such that the product delta of the second quantity of each of the other of the plurality of products substantially offsets the product delta associated with the first quantity of the at least one product. For each spread combination of the first and second quantities of the at least one product and the other of the plurality of products: an implied margin for the spread combination is computed; an outright margin for the spread combination is computed; an implied credit rate is computed for the spread combination based on the implied margin and the outright margin for the spread combination; a difference is computed between the implied credit rate and the target credit rate for the spread combination; and a sum is generated of each computed difference for each spread combination of the selected quantity of the at least one product. A target quantity is then identified of the at least one product of the set of quantities having the lowest summed computed difference, the target quantity of the at least one product in conjunction with quantities of the other of the plurality of products, computed to offset the product delta associated with the target quantity of the at least one product, representing a portfolio having optimal credit towards a margin requirement for the portfolio while maintaining the portfolio delta of the portfolio substantially close to zero.

In one embodiment, for a single quantity of each selected product of the plurality of products, a quantity is determined of at least one other product of the plurality of products such that the product delta of the quantity of the other product substantially offsets the product delta associated with the single quantity of the selected product. In one embodiment, the determination is based on market data. In one embodiment, the determination further comprises computing the quantity of the at least one other product.

In one embodiment, an outright margin requirement for each product of the spread combination obtained along with a target credit rate for the spread combination, such as from an exchange, a clearing organization or a combination thereof.

In one embodiment, the computing of the implied margin further includes computing the implied margin based on the outright margin requirement for the quantity of each product and the target credit rate and the computing of the outright margin further comprises computing the outright margin based on the outright margin requirements for the quantity of each product of the spread combination.

In one embodiment, the computing of the difference between the implied credit rate and the target credit rate further comprises computing a squared difference, the sum being generated as a sum of the squared differences of each spread combination FIG. 5 shows a table 500 of four exemplary financial products for treasuries, 2 year treasury bond TUZ7 (denoted also as "26"), 5 year treasury bond FVZ7 (denoted also as "25"), 10 year treasury bond TYZ7 (denoted also as "21"), and 30 year treasury bond USZ7 (denoted also as "17"). For a singular position in each of the set of financial products of interest, a neutral equivalent position in each of the remaining financial products is determined, based on market data, e.g. data provided by Bloomberg, a proprietary calculation, or otherwise derived. Exemplary proprietary calculations for computing neutral equivalent positions are shown in Appendix A.

The table 500 of FIG. 5 shows the ratios, referred to as hedge ratios, or equivalent neutral positions of each financial product versus the remaining financial products as derived from current market data available from the Bloomberg financial data service. It will be appreciated that once a neutral relationship is determined for one contract versus another, the inverse relationship may be derived therefrom, e.g. given the ratio of TUZ7 to FVZ7 of 1:1.08, the ratio of FVZ7 to TUZ7 may computed as 1:(1/1.08) or 1:0.925926. Each value represents, for a given singular position, i.e. one contract, of a particular financial product, the off-setting position that must be held in each of the other financial products such that the combined portfolio of the two financial products is delta neutral. Further, these hedge ratios set up a mathematical relationship which may be used, for a given quantity of one of the financial products, to extrapolate the neutral equivalent quantities of the remaining financial products while maintaining the delta neutral status of the portfolio. The disclosed embodiments may be used with other financial products as well, including derivatives other than those based on treasury securities. In one embodiment, the products may selected from those already contained within a given trader's portfolio.

The disclosed embodiments compute the quantity of each of the financial products to include in a portfolio in order to maximize the margin credit for the portfolio, with respect to a credit rate, while maintaining a delta neutral status therefore. The disclosed embodiments test variations in the quantities of the constituent financial products to determine the optimal positions. A given financial product's quantity is set at one of a set of test quantity values and the quantities of the remaining financial products are extrapolated therefrom, as was described above, based on the hedge ratios. For example, the set of test quantity values may include incremental quantities where the increment is 1, e.g. 1, 2, 3, 4, etc., where the increment is 0.1, e.g. 1, 1.1, 1.2, 1.3, etc. or other increments. Alternatively, the set of test quantity values may include non-incremental values. Each test quantity value of the given financial product, along with the associated quantities of the remaining financial products extrapolated therefrom, form a test portfolio which will be tested, as described below, to determine the margin credit which would be allocated by a risk management system, such as SPAN, and how close the determined margin credit approximates the maximum possible margin credit, based on the credit rate, allowed by the operator of the risk management system, e.g. the exchange. As will be discussed, the test portfolio whose margin credit comes the closest to the maximum possible margin credit, i.e. has the least error, is determined to be the optimal portfolio having the optimal quantities of the financial products therein.

FIG. 6 shows a table 600 which depicts an exemplary test portfolio for given quantity of a given financial product, e.g. 3, of the 30 year treasury bond, and the extrapolated quantities of the remaining financial products, e.g. the 2, 5 and 10 year treasury bonds, needed to maintain the delta neutral status of the portfolio based on the hedge ratios in the table of FIG. 5. It will be appreciated that any other one or more of the financial products could serve as the starting point from which the quantities of the remaining financial products are extrapolated based on the hedge ratios. In the given example shown in FIG. 6, a quantity of 3 30 year treasury bonds is offset by 5.1510 10 year treasury bonds (3*1.717), 7.8192 5 year treasury bonds (3*2.607) or 8.4448 2 year treasury bonds (3*2.816).

As shown in FIG. 7, for each test portfolio, the credit-adjusted margin requirement of each possible spread combination, referred to as the "implied margin requirement," 702 must be compared with the maximum possible margin requirement for that spread, referred to as the "outright margin requirement" 704 and an error or differential value is determined. The error values for all of the spreads of the test portfolio will be summed, as will be described below. Each financial product of the portfolio is spread against each of the other financial products, e.g. FVZ7 vs. TUZ7, TYZ7 vs. FVZ7, TYZ7 vs. TUZ7, USZ7 vs. TYZ7, USZ7 vs. FVZ7, and USZ7 vs. TUZ7, etc., each product of the spread being referred to as "leg." For an exemplary test portfolio having four financial products, there will be 6 possible unique spread combinations 706.

To compute the implied margin requirement 702 of a given spread 706, margin requirements 708 710 of each leg and a credit rate 712 for the spread 706 must be obtained, such as from an exchange, clearing organization or other risk management entity (not shown). The margin requirements 708 710 for each leg, referred to as an "outright margin requirement," is the margin requirement for a singular quantity of that financial product alone (the total outright margin requirement being the outright margin requirement for the product multiplied times the quantity of that product held). Therefore, the outright margin requirement for the spread is the sum total of each leg's outright margin requirement 708 710 multiplied by the quantity 714 716 of that product held, i.e. the quantities determined for the test portfolio. For example, for the test portfolio shown in FIG. 7, the outright margin requirement 708 for the first leg (FVZ7) of the first spread (FVZ7 vs. TUZ7) is 650 and, therefore, the total outright margin for this leg is 650 multiplied by 7 (the quantity 714 determined from the hedge ratios, rounded down) which equals 4550. The credit rate 712 indicates the portion, represented as a percentage, of the total outright margin requirement that would be required if the portfolio contains both legs of the spread 706, and represents the reduction in the risk of loss when the two positions are held together in the same portfolio. Credit rates 712 are specified or otherwise defined by the exchange, clearing organization or other risk management entity (not shown) monitoring the portfolio risk. Exemplary credit rates 712 include 0.9, 0.8 etc.

To compute the implied margin requirement 702 of the spread 706, the largest outright margin of the outright margins 708 710 for each leg is determined. The lowest outright margin of the outright margins 708 710 of each leg is then determined and discounted by the credit rate 712. The implied margin requirement 702 is the difference between the largest outright margin 708 710 of the two legs and the discounted lowest outright margin 708 710 of the two legs. For example, for the first spread (FVZ7 vs. TUZ7), the first leg (FVZ7) has an outright margin of 4550 (650*7) and the second leg (TUZ7) has an outright margin of 5200 (650*8). The largest outright margin is 5200 for the second leg, while the lowest outright margin is 4550 for the first leg. The credit rate is 0.9 and accordingly, lowest outright margin is discounted by multiplying it by the credit rate, or 4550*0.9 which equals 4095. The difference between the largest outright margin and the discounted lowest outright margin is then 5200−4095 or 1105.

The outright margin requirement 704 for the spread is simply the total of the outright margin requirements 708 710 of both legs. For example, for the first spread of the test portfolio shown in FIG. 7, the implied outright margin requirement is 5200+4550 or 9750.

In computing the implied 702 and outright 704 margin requirements for a given spread 706 based on the quantities 714 716 of the financial products determined in the test portfolio, the quantity values 714 716 may be rounded up or down to the nearest whole value and, as it will be appreciated, such rounding is implementation dependent. In the exemplary test portfolio of FIG. 7, the quantities 714 716 determined in FIG. 6 based on the hedge ratios of FIG. 5, have all been rounded down to the nearest whole number.

Once the implied 702 and outright margin requirements 704 are computed, they are compared to determine the implied credit rate 718 which is indicative of the difference between the implied 702 and outright 704 margin requirements. In particular, the implied margin requirement (e.g. 1105) is divided by the outright margin requirement (e.g. 9750) and the result is subtracted from 1 yielding the implied credit rate 718 which may be expressed as a percentage (88.67%). The implied credit rate 718 is then compared with the actual credit rate 712 using squared difference calculation to establish the error between them, i.e. the implied credit rate is subtracted from the actual credit rate and the result is squared yielding the error value 720 for the particular spread 706. The error value 720 of each spread 706 of the test portfolio is then summed and this total 722 will be compared with the totals from other test portfolios.

Each test portfolio is processed and then the resultant total error values 722 associated with each test portfolio are compared. The test portfolio associated with the lowest total error value 722 is the optimal portfolio which maximizes the margin credit for the trader while maintaining a delta neutral status of the portfolio.

In one embodiment, the portfolio processor 102 executes on a computer having a Pentium-class processor, or suitable equivalent, a hard disk drive, for example a hard disk drive having a ten (10) gigabyte capacity, a memory, for example a memory having a one (1) gigabyte capacity, and a suitable output device such as flat panel LCD display. Further, the computer executes an appropriate operating system, such as Microsoft Windows XP, published by the Microsoft Corporation, located in Redmond, Wash. The computer system 102 further may include a network interface and accompanying software for coupling the system with a network, the interface being of a suitable type for the network, such as an Ethernet or optical based network. The network may be a public or private network, such as the Internet, an intranet, a virtual private network, or other TCP/IP or non-TCP/IP based network as is known. Further, secure protocols, such as sHTTP or encryption, may be included to protect communications from being intercepted or modified and to generally authenticate users and ensure secure operation. It will be appreciated that any suitable computer system having suitable processing, storage and communications capabilities may be used with the disclosed embodiments, such as a mainframe computer, a mini-computer, a workstation, a personal computer or a personal digital assistant. It will be further appreciated the disclosed embodiments may be executed on a single computer system or one or more the components may be executed on a computer system which is separate from one or more computer system(s) executing the remaining of the components, and suitably interconnected, such as via a network.

While the disclosed embodiments relate to a computer software program which is stored in the memory of a computer and executed by the processor(s) of the computer to perform the disclosed functions, it will be appreciated that one or more of the disclosed components may be implemented in hardware or a combination of hardware and software, and is implementation dependent.

It is intended that the foregoing detailed description be regarded as illustrative rather than limiting, and that it be understood that it is the following claims, including all equivalents, that are intended to define the spirit and scope of this invention.

APPENDIX A

Exemplary Computations Of Neutral Equivalent Positions

Consider two assets $Z_1$ and $Z_2$ that follow a Wiener process. If we would like to create a perfectly hedged portfolio we can do the following:

$\Pi$: porfolio price
$d\Pi$: change in porfolio price
$\Delta$: desired hedge ratio $$d\Pi = dZ_1 + \Delta dZ_2$$

Wiener stochastic process =>

$$d\Pi = \mu_{z1} Z_1 dt + \sigma_{z1} Z_1 dW + \Delta(\mu_{z2} Z_2 dt + Z_2 Z_2 dW)$$

$$= (\mu_{z1} Z_1 + \Delta \mu_{z2}) dt + (\sigma_{z1} Z_1 + \Delta \sigma_{z2} Z_2) dW$$

perfect hedge => remove noise =>

$$(\sigma_{z1}Z_1 + \Delta\sigma_{z2}Z_2) = 0$$

$$\Rightarrow \Delta = -\frac{\sigma_{z1}Z_1}{\sigma_{z2}Z_2} = -\frac{\frac{dZ_1}{dr_1}}{\frac{dZ_2}{dr_2}}$$

where r is the underlying product (r1 for Z1 and r2 for Z2)
so if Z1 is a 30 year treasury future then r1 is the 30 year spot treasury bond For commodities (corn, wheat, soybeans) with a stable relationship over time we can imply the hedge ration by using linear regression:

let $\Delta Z_1$ and $\Delta Z_2$ represent the change in price of Z1 and Z2 respectively linear regression =>

$$\Delta Z_2 = \alpha + \beta \Delta Z_1 + \epsilon$$

=> $\beta$ is desired perfect hedge ratio $$\beta = \frac{\text{cov}(\Delta Z_2, \Delta Z_1)}{\text{var}(\Delta Z_2)} = \text{corr}(\Delta Z_2, \Delta Z_1) * \frac{\sigma_{z1}}{\sigma_{z2}}$$

where
cov: covariance
var: vanance
corr: correlation

What is claimed is:

1. A computer implemented method for identifying a portfolio having both a substantially neutral delta and optimal margin credit therefore, the computer including a processor, the method comprising:
    evaluating, by the processor, a plurality of portfolios, each portfolio containing at least two products and differing from other portfolios of the plurality of portfolio based on the quantities of the at least two products contained therein, the quantities of each of the at least two products specified to achieve a delta neutral for the portfolio, each portfolio being further characterized by at least one spread between the at least two products, each of the at least one spread being associated with an implied credit and a target credit;
    aggregating, by the processor, for each portfolio of the plurality of portfolios, differences between the implied credits and the target credits for each of the at least one spread; and
    identifying, by the processor, an optimal portfolio as the portfolio of the plurality of portfolios whose aggregate difference indicates a greater number of the at least one spread with an implied credit within a difference to the target credit than other portfolios of the plurality of portfolios.

2. The computer implemented method of claim 1 further comprising:
    for each of the at least one spread of each portfolio of the plurality of portfolios:
    computing, by the processor, an implied margin requirement for the spread;
    computing, by the processor, an outright margin requirement for the spread;
    computing, by the processor, an implied credit rate based on the implied and outright margin requirements; and
    computing, by the processor, the difference between the implied credit and the target credit based on the implied credit rate and a target credit rate for the spread.

3. The computer implemented method of claim 2, further comprising:
    obtaining, by the processor, the target credit rate from an exchange, clearing organization, or combination thereof.

4. The computer implemented method of claim 2 wherein the computing of the difference between the implied credit and the target credit further comprises computing a squared difference.

5. The computer implemented method of claim 4 wherein the aggregating further comprises summing the squared differences of each spread.

6. A computer implemented system for identifying a portfolio having both a substantially neutral delta and optimal margin credit therefore, the system comprising:
    a portfolio processor implemented in the computer and operative to evaluate a plurality of portfolios, each portfolio containing at least two products and differing from other portfolios of the plurality of portfolio based on the quantities of the at least two products contained therein, the quantities of each of the at least two products specified to approach a neutral delta for the portfolio, each portfolio being further characterized by at least one spread between the at least two products, each of the at least one spread being associated with an implied credit and a target credit;
    the portfolio processor including:
        an aggregation processor operative to aggregate, for each portfolio of the plurality of portfolios, differences between the implied credits and the target credits for each of the at least one spread; and
        a portfolio identifier coupled with the aggregation processor and operative to identify an optimal portfolio as the portfolio of the plurality of portfolios whose aggregate difference indicates a greater number of the at least one spread with an implied credit within a difference to the target credit than other portfolios of the plurality of portfolios.

7. The computer implemented system of claim 6 wherein the aggregation processor is further operative, for each of the at least one spread of each portfolio of the plurality of portfolios, to compute an implied margin requirement for the spread, computing an outright margin requirement for the spread, compute an implied credit rate based on the implied and outright margin requirements, and compute the difference between the implied credit and the target credit based on the implied credit rate and a target credit rate for the spread.

8. The computer implemented system of claim 7, wherein the aggregation processor is further operative to obtain the target credit rate from an exchange, clearing organization, or combination thereof.

9. The computer implemented system of claim 7 wherein the aggregation processor is further operative to compute a squared difference between the implied credit and the target credit.

10. The s computer implemented system of claim 9 wherein the aggregation processor is further operative to sum the squared differences of each spread.

* * * * *